(12) United States Patent
Akimoto et al.

(10) Patent No.: US 8,166,628 B2
(45) Date of Patent: May 1, 2012

(54) METHOD OF MANUFACTURING COIL FOR STATORS MOUNTED IN ROTARY ELECTRIC MACHINES

(75) Inventors: Akito Akimoto, Kariya (JP); Yoshinobu Yanagisawa, Toyota (JP); Shuzo Muraki, Anjo (JP); Masaomi Dobashi, Kariya (JP); Kentaro Mitsuki, Toyoake (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 511 days.

(21) Appl. No.: 12/498,601

(22) Filed: Jul. 7, 2009

(65) Prior Publication Data

US 2010/0000077 A1 Jan. 7, 2010

(30) Foreign Application Priority Data

Jul. 7, 2008 (JP) ................................. 2008-177291
Aug. 18, 2008 (JP) ................................. 2008-210049
Jul. 1, 2009 (JP) ................................. 2009-156914

(51) Int. Cl.
*H02K 15/00* (2006.01)
(52) U.S. Cl. ............ 29/596; 29/603.24; 29/605; 29/618
(58) Field of Classification Search .................. 310/140, 310/184, 198, 208, 216.091
See application file for complete search history.

(56) References Cited

U.S. PATENT DOCUMENTS

| 1,430,130 | A | * | 9/1922 | Limbach ....................... 310/198 |
| 6,140,735 | A | * | 10/2000 | Kato et al. ..................... 310/201 |
| 6,760,965 | B2 | * | 7/2004 | Asao et al. ...................... 29/596 |
| 2009/0146523 | A1 | | 6/2009 | Kouda et al. |

FOREIGN PATENT DOCUMENTS

| JP | 3894004 | 12/2006 |
| JP | 2009-131091 | 6/2009 |

* cited by examiner

*Primary Examiner* — Thiem Phan
(74) *Attorney, Agent, or Firm* — Nixon & Vanderhye PC

(57) ABSTRACT

In manufacturing a stator coil for rotary electric machine having phase windings, plural conductive shaped wire members are integrated mutually to form an integrated body. Each shaped wire member has plural straight portions and plural turn portions alternately connecting adjacent straight portions at each of both ends of each straight portion. The body has plural straight superposed portions each formed by mutually superposing the plural straight portions. A wound-up body has plural straight stack portions The straight portions are fitted to respective fitting grooves of an alignment member, the fitting grooves being formed in the alignment member at intervals each corresponding to the size of a gap between adjacent straight stack portions. The integrated body is wound about a core member together with the alignment member, with the straight portions being fitted to the alignment member to form the wound-up body.

20 Claims, 24 Drawing Sheets

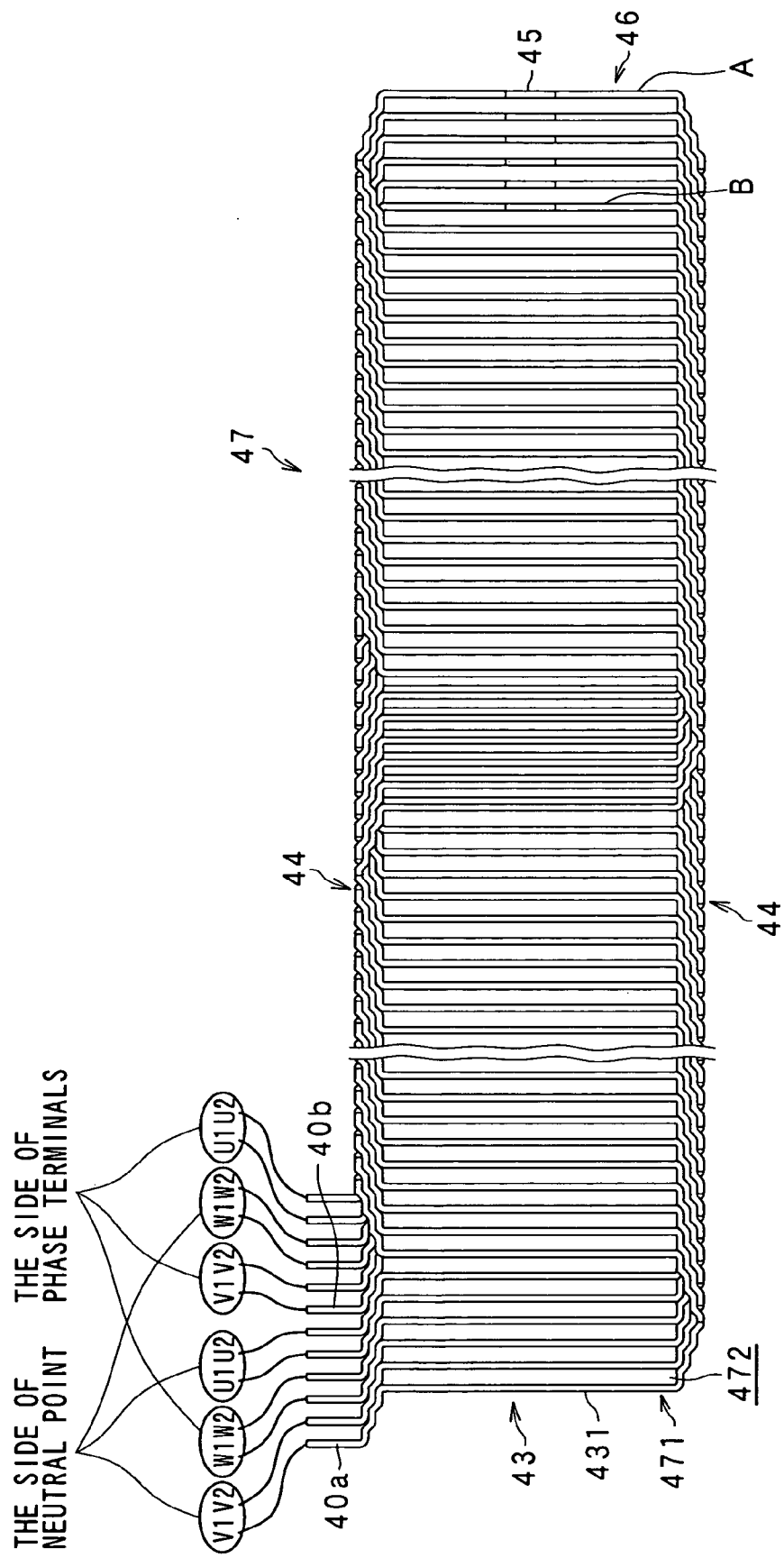

METHOD OF MANUFACTURING COIL FOR STATORS MOUNTED IN ROTARY ELECTRIC MACHINES

CROSS-REFERENCE TO RELATED APPLICATION

This application is based on and claims the benefit of priority from earlier Japanese Patent Applications No. 2008-177291 filed on Jul. 7, 2008, No. 2008-210049 filed Aug. 18, 2008, and No. 2009-156914 filed Jul. 1, 2009, the description of which are incorporated herein by reference.

BACKGROUND OF THE INVENTION

1. Technical Field of the Invention

The present invention relates to a method of manufacturing coil for stators mounted in rotary electric machines, and in particular, to a method of manufacturing coil (also referred to as a stator coil) used for stators mounted in rotary electric machines which are loaded on vehicles.

2. Related Art

In recent years, small size, high power and high quality have been demanded of rotary electric machines used as electric motors and electric generators. Taking rotary electric machines loaded on vehicles as an example, the space for loading such a rotary electric machine has been increasingly reduced, while the output has been increasingly required to be enhanced.

Conventional rotary electric machines that have been known include a type of rotary electric machine, as described in Japanese Patent No. 3894004, for example, having a stator wound with a stator coil which is formed of continuous windings. Such a rotary electric machine is provided with a stator whose stator coil has three-phase windings formed of twelve element wires, providing a structure where twenty-four end portions of the element wires are axially projected from an axial end face of the stator core. Therefore, the stator needs a large space on an outer side of the axial end face of the stator core, for connecting the end portions of the element wires with each other, making large the axial dimension of the stator.

To take a measure for this, the applicant of the present application previously filed an application (e.g., Japanese Patent Application No. 2007-305104) concerning a stator for rotary electric machines, which stator is able to suppress the increase in the size of the stator. This stator has a stator coil in which a plurality of phase windings are accommodated in a plurality of slots of the stator core, while being wound about the stator core to form an undulation in the circumferential direction. Each phase wire is constituted of a first winding portion formed of a continuous wire and a second winding portion formed of a continuous wire and serially connected to the first winding portion. The joint portion between the first and second winding portions is disposed in a slot of the stator core. Accordingly, this stator coil can reduce the number of end portions of the phase windings projected from the axial end face of the stator core. Thus, the space needed for mutually connecting the end portions of the phase windings can be reduced, whereby the increase in the size of the stator can be suppressed.

For example, methods of manufacturing a stator coil formed of continuous windings include a method as presented below. First, a plurality of shaped wire members are shaped from electrically conductive wires. In each of the shaped wire members, a plurality of juxtaposed straight portions are connected through a plurality of turn portions. The shaped wire members are integrated with each other to form an integrated body. In the integrated body, a plurality of pairs of shaped wire members, each pair consisting of one shaped wire member and another shaped wire member, are juxtaposed in the longitudinal direction of the integrated body. Each pair of shaped wire members constituting the integrated body has a plurality of straight superposed portions in the longitudinal direction of the integrated body. The straight superposed portions are formed by superposing a plurality of straight portions of one shaped wire member with a plurality of respective straight portions of another shaped wire member.

Thus, in the integrated body, a plurality of straight superposed portions are juxtaposed in the longitudinal direction of the integrated body. The integrated body is wound up about a core member with a predetermined number of winding turns to form a wound-up body. The wound-up body has a plurality of straight stack portions in the circumferential direction, in each of which a plurality of straight superposed portions in one pair of shaped wire members are radially stacked.

In the wound-up body obtained in this way, the straight stack portions of are disposed in the respective slots of the stator core, with the turn portions being disposed outside the slots, to thereby provide a stator coil. However, the above manufacturing method is likely to cause offset in the superposition of the straight portions of the straight superposed portions, or to provide uneven intervals between adjacent straight superposed portions in the integrated body.

Therefore, in an obtained wound-up body, it is likely that offset is caused in the superposition of the plurality of straight portions in the respective straight stack portions, or the intervals are uneven between adjacent straight stack portions. Therefore, this may degrade the accuracy in the alignment of the straight portions in the respective slots, or may degrade the uniformity in the intervals (pitch) between the straight stack portions disposed in adjacent slots, when the straight stack portions of the stator coil are disposed in the respective slots of the stator core. Degradation in the alignment accuracy of the straight portions or degradation in the uniformity of pitch may lead to low slot occupancy in the stator, or power reduction of the rotary electric machine using the stator.

SUMMARY OF THE INVENTION

The present invention has been made in light of the circumstances described above, and has as its object to enhance the accuracy in the alignment of the straight portions in the straight stack portions of a wound-up body and to enhance the accuracy in the pitch between adjacent straight stack portions of the wound-up body, in manufacturing the wound-up body of a stator coil, which is wound with phase windings each constituted of continuous windings.

In order to achieve the above issue, the present invention provides, as its first mode, a method of manufacturing a stator coil which is wound about a stator of a rotary electric machine and provides a plurality of phase windings. This manufacturing method comprises: a shaping step of shaping a plurality of shaped wire members from electrically conductive wires providing the phase windings; an integrating step of forming an integrated body by integrating the plurality of shaped wire members with each other; and a winding step of forming a wound-up body by winding the integrated body about a core member. Each of the shaped wire members has a plurality of straight portions juxtaposed in the longitudinal direction of the integrated body, and a plurality of turn portions alternately connecting the straight portions, which are adjacent to each other, at one end and the other end of each of the straight portions; the integrated body has a plurality of straight superposed portions in the longitudinal direction, the plurality of straight superposed portions each being formed by mutually superposing the plurality of straight portions; and the wound-up body obtained at the winding step has a plurality of straight stack portions in the circumferential direction of the wound-up body. At the winding step, the straight portions of the integrated body are fitted to respective fitting grooves of an alignment member, the fitting grooves being formed in the alignment member at intervals each corresponding to the size of a gap between adjacent ones of the plurality of straight stack portions, the integrated body being wound about the core member together with the alignment member, with the straight portions being fitted to the alignment member to form the wound-up body.

At the winding step in this configuration, the straight portions of the integrated body are fitted to the respective fitting grooves of the alignment member, and, in this fitted state, the integrated body is wound about the core member together with the alignment member to form the wound-up body. The fitting grooves of the alignment member are provided at intervals each corresponding to the size of a gap between adjacent ones of the plurality of straight portions of the wound-up body. The straight portions are fitted to such fitting grooves, and then winding turns are imparted in the fitted state. As a result, the straight portions in the straight superposed portions of the integrated body can be aligned by the alignment member in the direction of the superposition, with the superposition of the straight portions being justified. At the same time, the size of the intervals between adjacent straight superposed portions can be uniformed by the alignment member. Thus, the wound-up body can be obtained in which the straight portions are aligned in the radial direction of the wound-up body in each of the plurality of straight stack portions juxtaposed in the circumferential direction of the wound-up body, and the intervals between circumferentially adjacent straight stack portions are uniformed.

Thus, with this configuration, in winding and manufacturing a stator coil which is formed by winding phase windings constituted of continuous windings, the alignment accuracy of the straight portions can be enhanced in each of the straight stack portions of the wound-up body, while the pitch accuracy can be enhanced in the adjacent straight stack portions. Therefore, application of the stator coil having this configuration to the stator of a rotary electric machine may ensure reliable accommodation of the straight stack portions of the wound-up body in the slots of the stator core to thereby enhance the slot occupancy in the stator and enhance the output of the rotary electric machine using the stator. Further, since this configuration enables alignment in each of the straight stack portions of the wound-up body, the straight stack portions of the wound-up body can be easily accommodated in the slots of the stator core to thereby also enhance the productivity of the stators.

According to a second mode of the present invention, at the winding step, winding gears that engage with each other are provided at the core member and the alignment member to wind the integrated body about the core member together with the alignment member, with the mutual engagement of the winding gears. With this configuration, when the integrated body is wound about the core member together with the alignment member, winding turns can be imparted while the winding gears are being engaged with each other. Therefore, circumferential positional offset between the winding face of the core member and the integrated body can be prevented, whereby alignment can be established in each of the straight stack portions of the wound-up body.

According to a third mode of the present invention, the alignment member has different depths that determine radial positions of the respective straight portions which have been fitted to the alignment member at the time of being wound about the core member, in response to radially different respective heights in the integrated body already wound about the core member. With this configuration, owing to the different depths in the alignment member, winding turns can be imparted, while preventing positional offset that would be caused by the radially different heights when the integrated body is wound about the outer periphery of the integrated body already wound about the core member, whereby alignment can be established in each of the straight stack portions of the wound-up body.

According to a fourth mode of the present invention, at the winding step, curve forming is performed for the integrated body before being wound about the core member, according to a curvature of a winding face of the core member. With this configuration, curve forming can be performed for the integrated body in advance according to the curvature of the winding face of the core member. Therefore, the tension against the winding turns can be mitigated and the winding operation can be facilitated.

According to a fifth mode of the present invention, at the winding step, the curve forming for the integrated body is performed in a state where the straight portions of the integrated body are fitted to the respective fitting grooves of the alignment member. With this configuration, the straight portions of the integrated body are fitted to the respective fitting grooves of the alignment member in the state where curve forming has not yet been performed for the integrated body. This may provide an advantage of facilitating the fitting operation.

According to a sixth mode of the present invention, at the winding step, a plurality of integrated bodies are used, with the straight portions of the integrated bodies being stuck one on the other and fitted to fitting grooves of an alignment member, the fitting grooves being formed in the alignment member at intervals each corresponding to the size of a gap between adjacent ones of the plurality of straight stack portions, the integrated bodies being wound about the core member together with the alignment member, with the straight portions being fitted to the alignment member to form the wound-up body. With this configuration, instead of winding one integrated body about the core member by a plurality of number of winding turns for the formation of the wound-up body, a plurality of integrated bodies each corresponding to one winding turn are prepared and the integrated bodies corresponding to a certain number of winding turns are stuck in the fitting grooves of the alignment body. Thus, the wound-up body can be formed with one winding turn of the alignment member, without the necessity of imparting a plurality of winding turns of the alignment member to the core member.

According to a seventh mode of the present invention, at the winding step, a plurality of integrated bodies are used, with the straight portions of the integrated bodies being stuck one on the other and fitted to fitting grooves of an alignment member, the fitting grooves being formed in the alignment member at intervals each corresponding to the size of a gap between adjacent ones of the plurality of straight stack portions, the integrated bodies being wound about the core member together with the alignment member, with the straight portions being fitted to the alignment member to form the wound-up body. With this configuration, the integrated body and the alignment member are conveyed by the conveyor belt, exerting an advantage of stably conveying the integrated body to the core member.

According to an eighth mode of the present invention, at the winding step, conveyor gears that engage with each other are provided at the conveyor belt and the alignment member to convey the integrated body and the alignment member by the conveyor belt, while the conveyor gears are being engaged with each other. With this configuration, when the integrated body and the alignment member are conveyed by the conveyor belt, the conveyance is performed while the conveyor gears are being engaged with each other. Therefore, the occurrence of positional offset in the conveyance direction can be prevented between the conveyor belt, and the integrated body and the alignment member. This may ensure stable conveyance and performance of winding turns.

According to a ninth mode of the present invention, at the winding step, the integrated body is wound up with rotation of the core member, while speed of advance of the conveyor belt is adjusted so that the integrated body and the alignment member can be conveyed according to speed of advance of the integrated body at a position of being wound about the core member with the rotation. With this configuration, the integrated body and the alignment member are conveyed by the conveyor belt, according to the speed of advance of the integrated body at the position where the integrated body is wound about the core member. This may ensure stable conveyance and performance of winding turns.

According to a tenth mode of the present invention, in the winding step, winding turns are imparted with the integrated body wound about the core member being pressed against the core member in the radially inward direction. With this configuration, winding turns can be imparted, while the integrated body wound about the core member is being pressed against the core member in the radial inward direction. This may prevent the integrated body wound about the core member from floating outwardly, and may ensure stable performance of winding turns. Also, in the case where winding gears and the conveyor gears are used, an advantage of reliable gear engagement can be attained.

According to an eleventh mode of the present invention, in the winding step, a separator/presser member is used, the separator/presser member serving as an alignment member separator that separates the integrated body wound about the core member from the alignment member, and as an integrated body presser that presses the integrated body wound about the core member so as not to float on the core member. With this configuration, use of the separator/presser member may enable smooth separation of the integrated body wound about the core member from the alignment member with the aid of the alignment member separator. At the same time, the integrated body wound about the core member can be prevented from floating from the core member with the aid of the integrated body presser.

BRIEF DESCRIPTION OF THE DRAWINGS

In the accompanying drawings:

FIG. 8 is a development view illustrating the stator coil, or a plan view illustrating an integrated body related to the first embodiment;

DETAILED DESCRIPTION OF THE PREFERRED EMBODIMENTS

With reference to the accompanying drawings, hereinafter will be described details of some embodiments of a method of manufacturing a coil (stator coil) which is wound about a stator of a rotary electric machine related to the present invention.

(First Embodiment)

Referring to FIGS. 1 to 17, hereinafter will be described, in detail, a first embodiment of a method of manufacturing a stator coil related to the present invention.

First, a configuration of a rotary electric machine 1 is described. The rotary electric machine 1 is integrated with a stator coil that has been obtained by the method of manufacturing a stator coil according to the present embodiment. The rotary electric machine 1 may, for example, be an electric motor, an electric generator or a motor generator, which is loaded on a vehicle.

Figure 1:
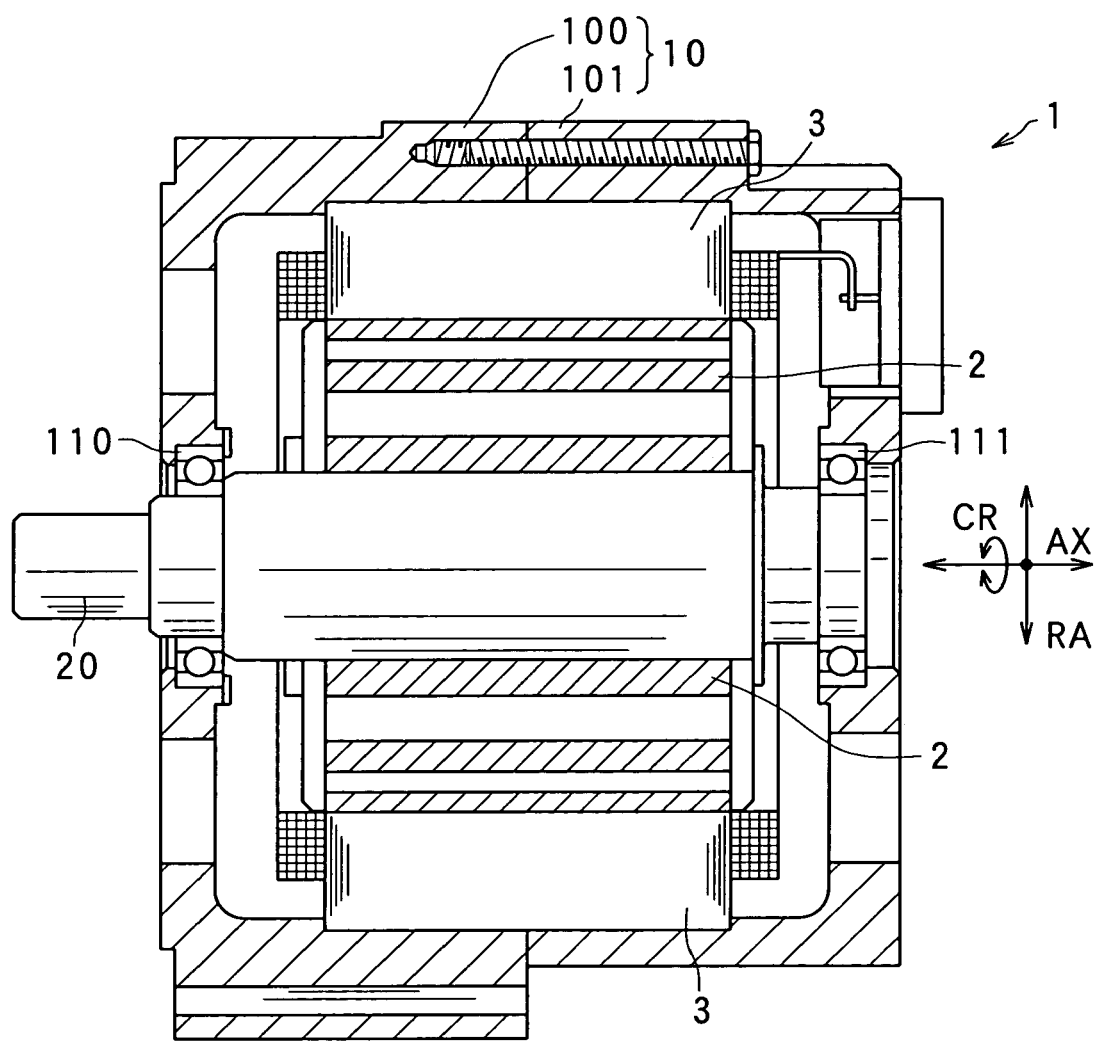
FIG. 1 is a schematic axial cross-sectional view illustrating a configuration of a rotary electric machine related to a first embodiment of the present invention.

As shown in FIG. 1, the rotary electric machine 1 includes: a housing 10 consisting of a pair of bottomed housing members 100, 101 each having substantially a cylindrical shape and joined to each other at the opening portions thereof; a rotary shaft 20 rotatably supported by the housing 10 via bearings 110, 111; a rotor 2 secured to the rotary shaft 20; and a stator 3 secured to the housing 10, being located at a position of enclosing the rotor 2 inside the housing 10.

It should be appreciated that, in describing the structure of the rotary electric machine 1: the longitudinal direction of the rotary shaft 20, i.e. the direction along the center axis of the housing 10, is referred to as an axial direction AX; the direction radially extending from the axial direction AX along a plane perpendicular to the axial direction is referred to as a radial direction RA; and the direction along the circumference of a circle centering on the axial direction AX is referred to as a circumferential direction CR.

Figure 2:
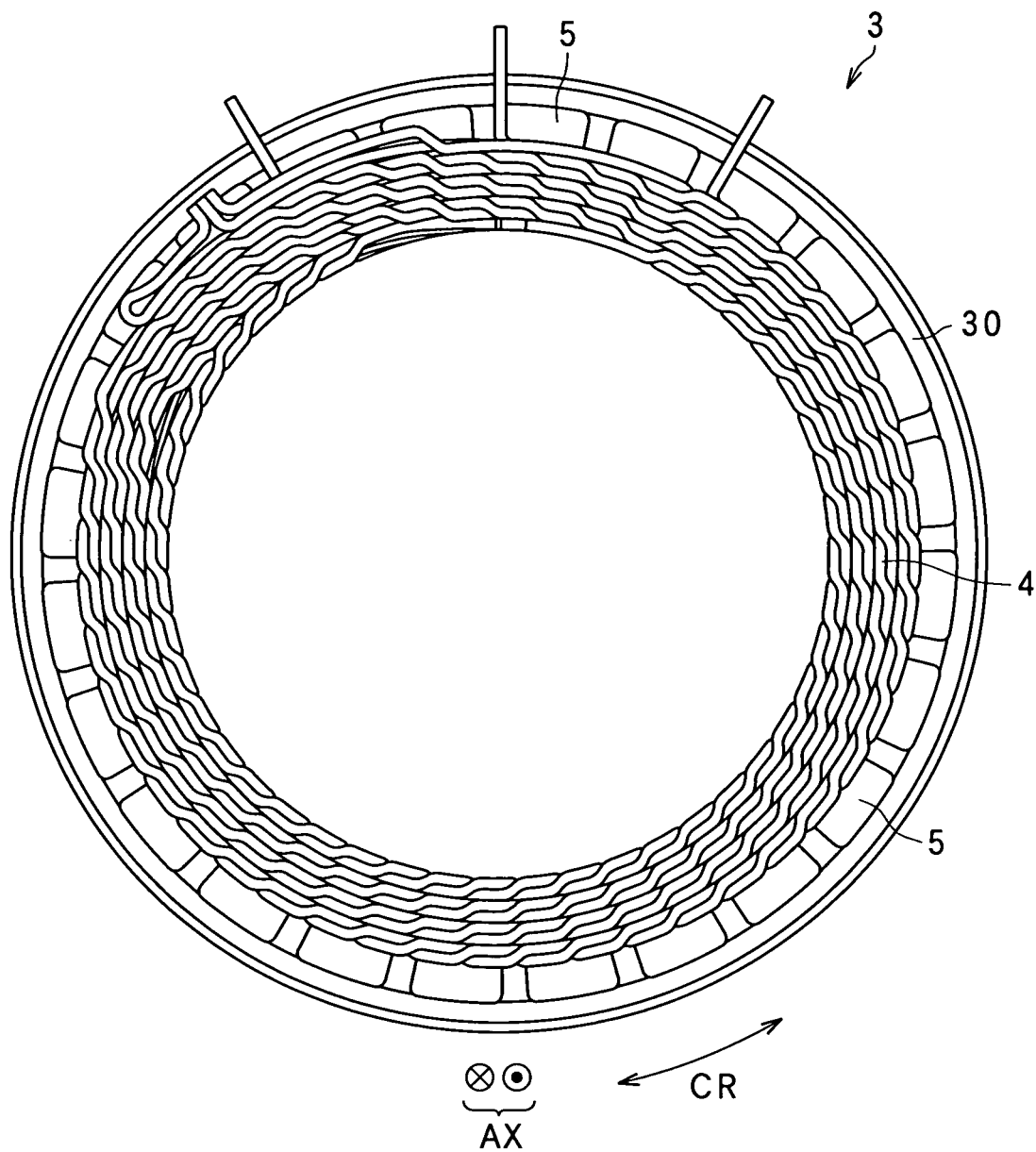
FIG. 2 is a plan view illustrating a stator related to the first embodiment.

The rotor 2 has an outer periphery opposed to an inner periphery of the stator 3, the outer periphery being formed with a plurality of alternately differentiated magnetic poles in the circumferential direction CR using permanent magnets. The number of magnetic poles of the rotor 2 depends on the rotary electric machines and thus is not specified. The present embodiment uses an eight-pole (four N poles and four S poles) rotor. As shown in FIG. 2, the stator 3 is configured being provided with a stator core 30, a three-phase stator coil 4 formed of a plurality of phase windings and pieces of insulating paper 5, which are arranged between the stator core 40 and the stator coil 4.

Figure 3:
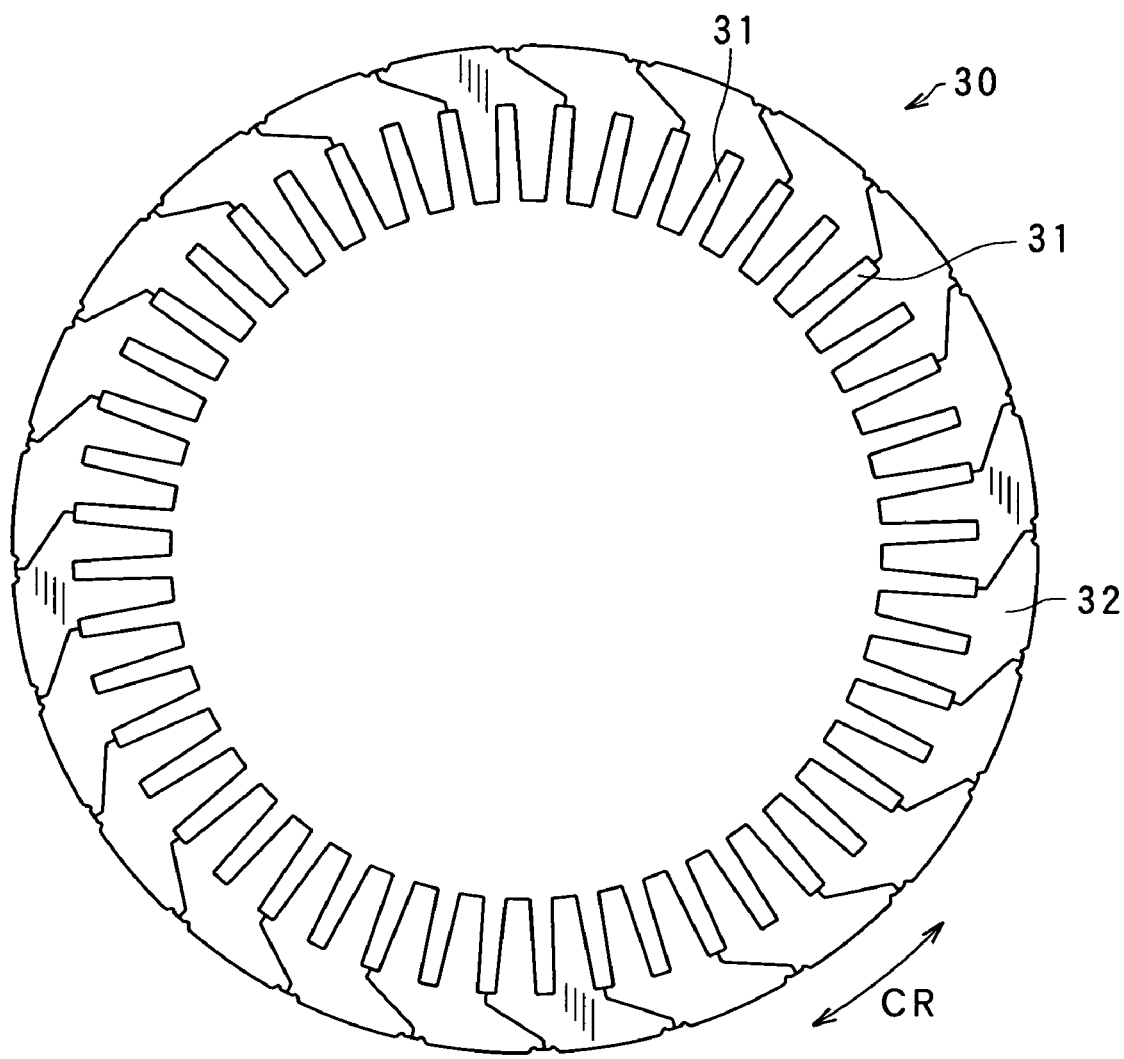
FIG. 3 is a plan view illustrating a stator core related to the first embodiment.

As shown in FIG. 3, the stator core 30 has an annular shape with a plurality of slots 31 being formed in its inner periphery. The plurality of slots 31 are formed such that the depthwise direction thereof will coincide with the radial direction RA. The slots 31 of the stator core 30 are formed at the rate of two per phase of the stator coil 4. In the present embodiment, the number of the slots is forty-eight, as resulting from 8×3×2=48.

Figure 4:
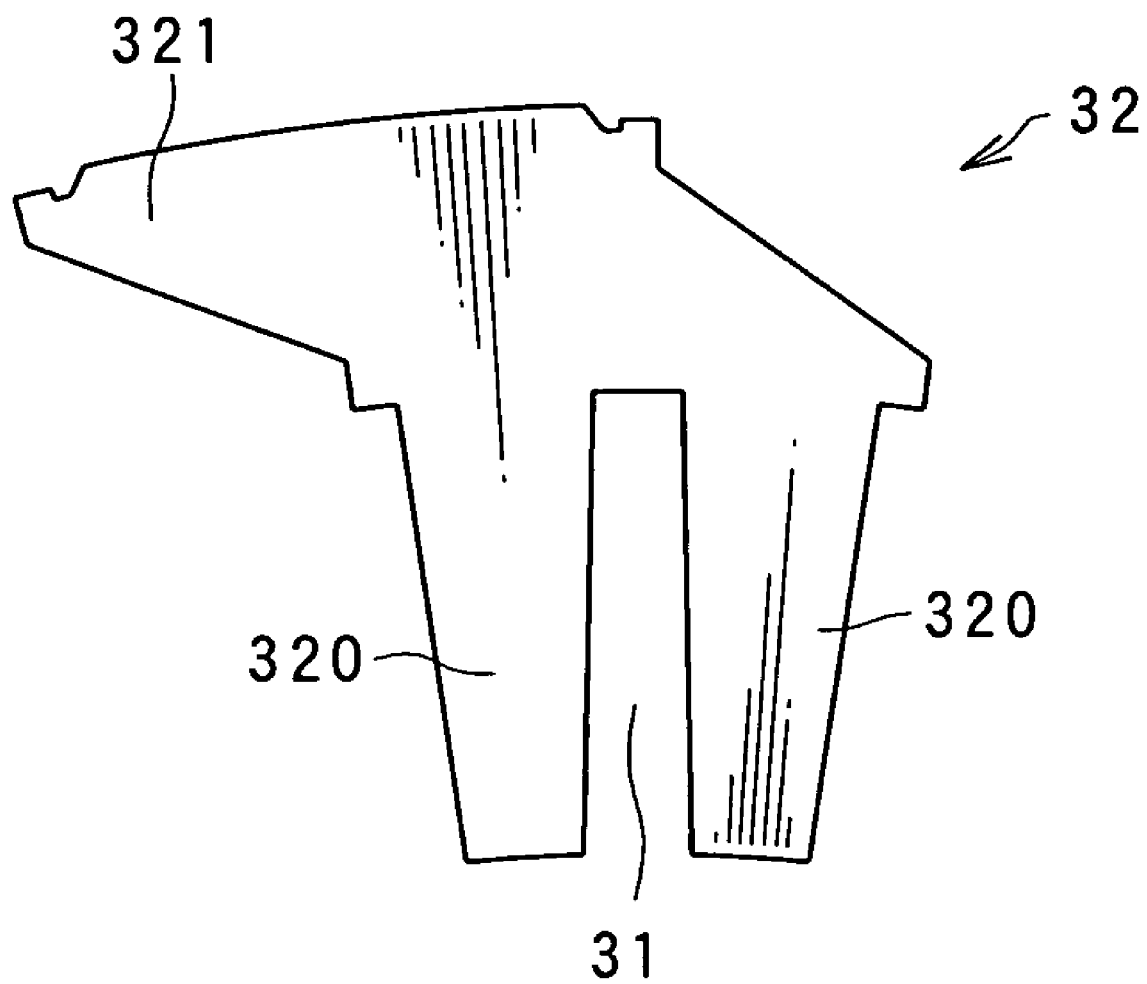
FIG. 4 is a plan view of a segment laminate core related to the first embodiment.

The stator core 30 is formed by connecting in the circumferential direction CR a predetermined number (twenty-four in the present embodiment) of segment cores 32 shown in FIG. 4. Each of the segment cores 32 has a shape defining one slot 31 and also defining another slot 31 between the segment core 32 concerned and a segment core 32 adjacently located in the circumferential direction CR. Specifically, each segment core 32 has a pair of teeth portions 320 inwardly extending in the radial direction RA and a back core portion 321 connecting the teeth portions 320 on the outer side with respect to the radial direction RA.

Each of the segment cores 32 constituting the stator core 30 is formed by laminating electromagnetic steel plates, with insulating films being disposed between the laminated electromagnetic steel plates. The segment cores 32 constituting the stator core 30 may each be formed not only of a laminated body of the electromagnetic steel plates but also of known thin metal plates and thin insulating films.

Figure 5A:
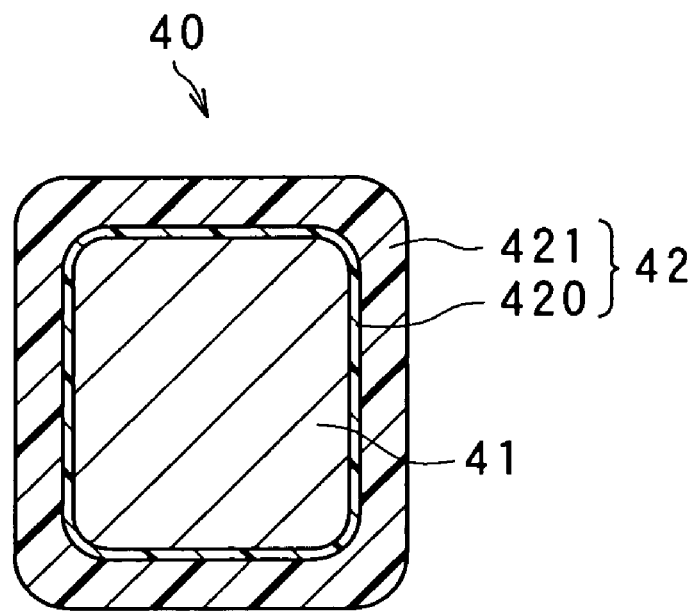
FIGS. 5A and 5B are cross-sectional views each illustrating a winding constituting the stator coil related to the first embodiment.

The stator coil 4 is formed by winding a plurality of windings 40 using a predetermined winding method. As shown in FIG. 5A, each of the windings 40 constituting the stator coil 4 is formed of a copper conductor 41 and an insulating film 42 covering the outer periphery of the conductor 41 and consisting of an inner layer 420 and an outer layer 421 for the insulation of the conductor 41.

Thus, the large thickness of the insulating film 42 consisting of the inner and outer layers 420, 421 negates the necessity of inserting insulating paper or the like between the windings 40 for the insulation therebetween. However, insulating paper may be arranged between the windings 40 or between the stator core 30 and the stator coil 4 as shown in FIG. 2.

Figure 5B:
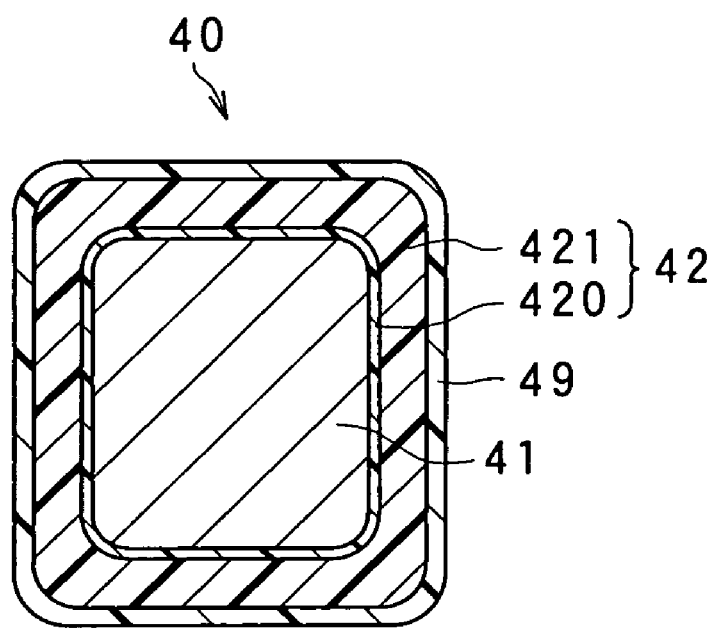

As shown in FIG. 5B, the winding 40 of the stator coil 4 may be formed such that the outer periphery of the insulating film 42 consisting of the inner and outer layers 420, 421 is covered with a fusing material 49 of an epoxy resin, or the like. In this case, the fusing material 49 is fused faster than the insulating film 42 by the heat generated in the electric rotary machine 1. Therefore, the plurality of windings 40 disposed in the same one slot 31 will be mutually thermally adhered by the fusing material 49. As a result, the plurality of windings 40 disposed in the same one slot 31 are integrated to turn the windings 40 to a rigid body, whereby the mechanical strength of the windings 40 in the slot 31 is enhanced.

Figure 6:
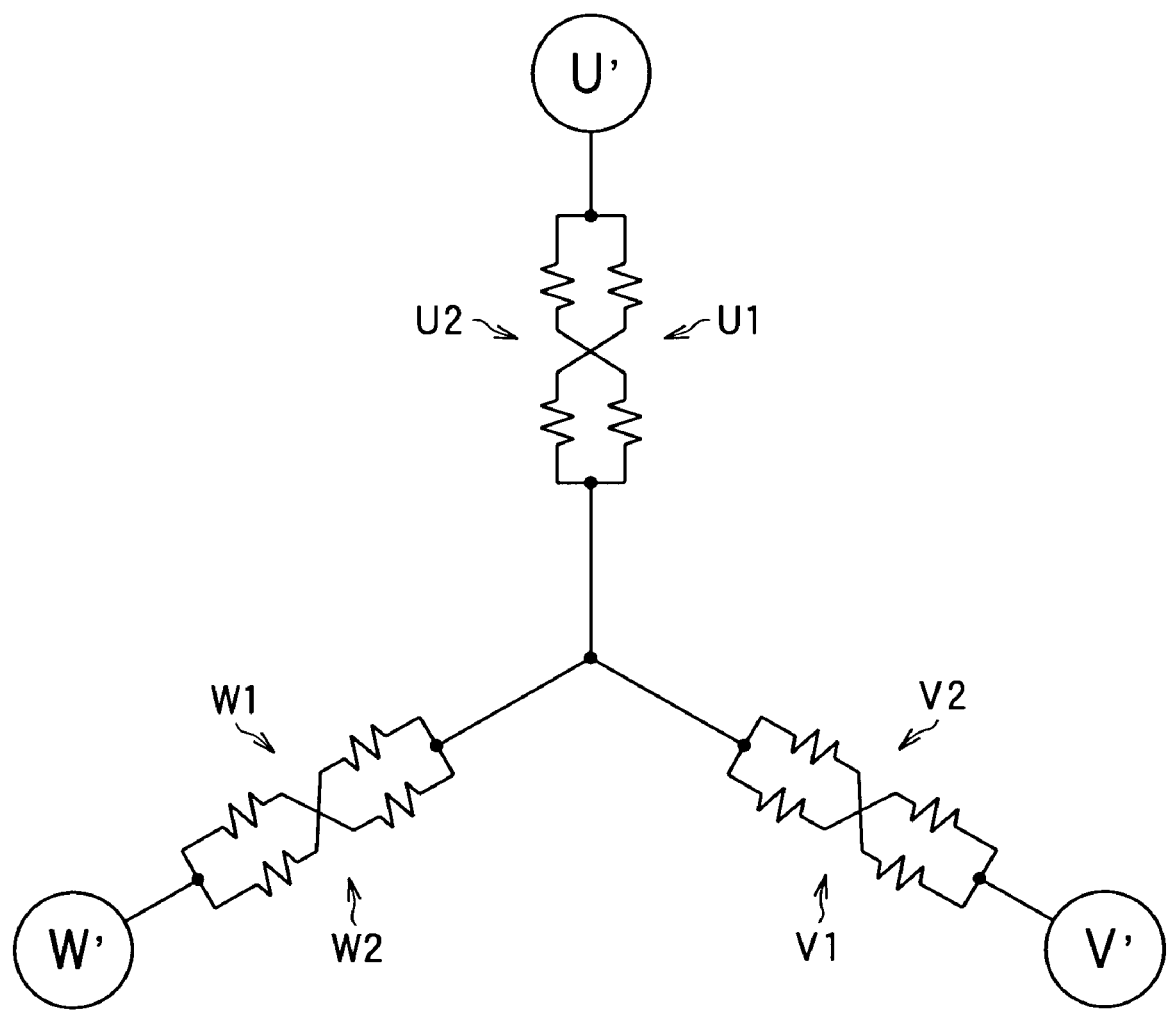
FIG. 6 is a view illustrating wire connection of the stator coil related to the first embodiment.
Figure 7:
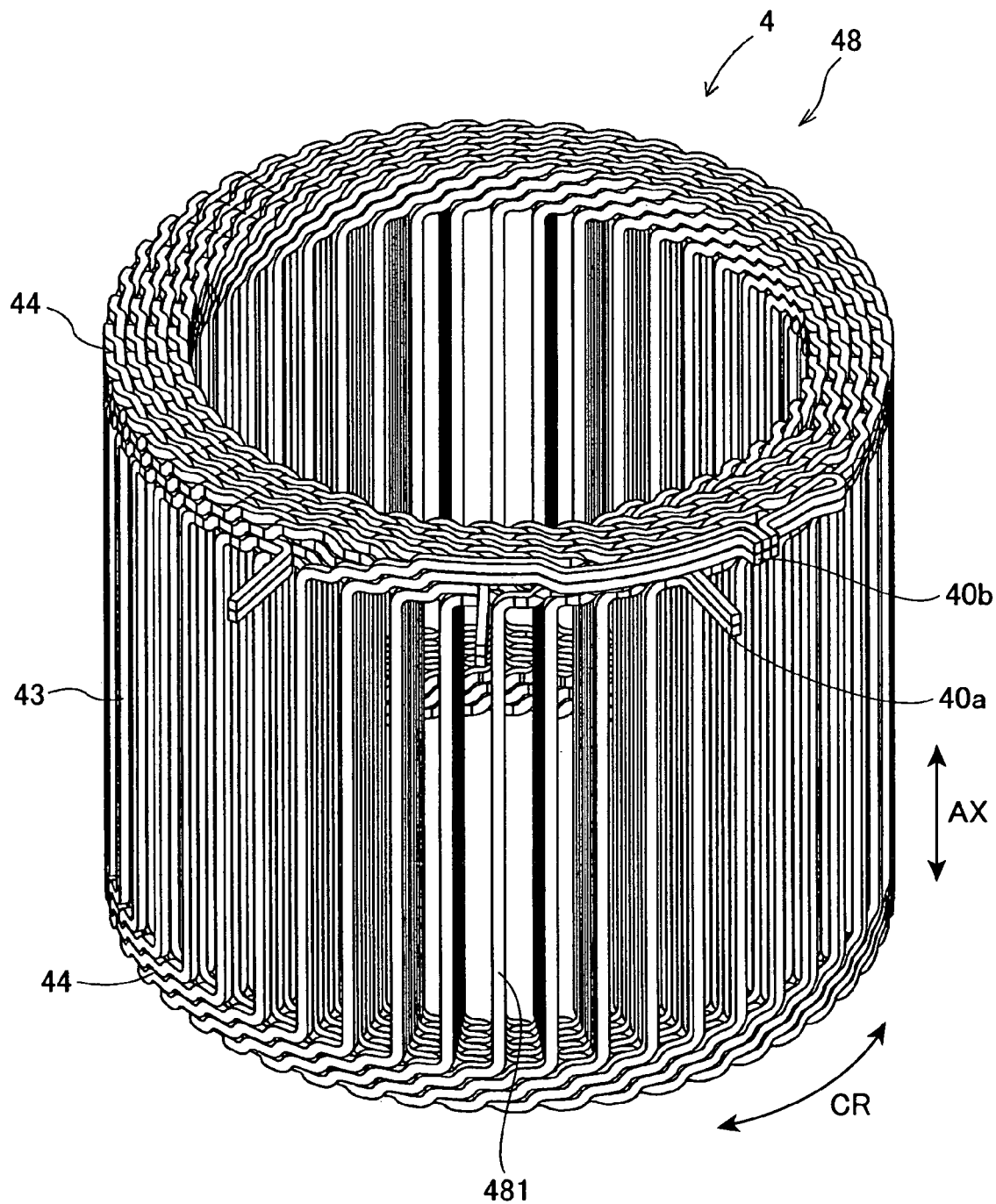
FIG. 7 is a perspective view of a wound-up body serving as the stator coil related to the first embodiment.

As shown in FIG. 6, the stator coil 4 is formed of three-phase windings (U1, U2, V1, V2, W1, W2), each being made up of two wires. As shown in FIG. 7, the stator coil 4 is a wound-up body 48 obtained by winding up an integrated body 47 (see FIG. 8) in which a plurality of windings 40 are integrated and formed into a predetermined shape. Each of the windings 40 is formed into a shape suitable for wave winding along the circumferential direction CR on the inner peripheral side of the stator core 30.

Each of the windings 40 configuring the stator coil 4 includes straight slot-accommodation portions 43 each of which is accommodated in each slot 31 of the stator core 30, and turn portions 44 each connecting adjacent slot-accommodation portions 43. The slot-accommodation portions 43 are accommodated in every predetermined ordinal slot 31 (in the present embodiment, 3 phases×2 slots=6$^{th}$ slot). The turn portions 44 are formed, being projected from each end face in the axial direction AX of the stator core 30.

The stator coil 4 is formed by permitting both ends of the plurality of windings 40 to project from an end face in the axial direction AX of the stator core 30, and by undulately winding the plurality of windings 40 in the circumferential direction CR. One phase of the stator coil 4 is formed by welding and joining end portions of a first winding 40a and a second winding 40b. In other words, one phase of the stator coil 4 is formed of a pair of windings that has been obtained by mutually joining the end portions of two shaped wire members formed from two electrically conductive wires.

The slot-accommodation portions 43 of the first winding 40a and those of the second winding 40b are accommodated in the same one slot 31. In this case, the slot-accommodation portions 43 of the first winding 40a are adapted to be positioned being alternated by the slot-accommodation portions 43 of the second winding 40b in the depthwise direction of the slot 31. A joint 45 between the first and second windings 40a, 40b is formed in the slot-accommodation portion 43 that serves as a return portion 46 where the winding direction of the first and second windings 40a, 40b is reversed.

FIG. 8 is a development view illustrating the stator coil 4, or a plan view illustrating the integrated body 47 before being wound up. The stator coil 4 has six pairs of the first and second windings 40a, 40b that have different winding directions. A coil of 3-phase (U, V, W)×2-slot (double-slot coil) is provided using these six pairs of windings. In each pair, the end of the first winding 40a, which is opposite to the end on the side of the neutral point (or the side of the phase terminal), is connected to the end of the second winding 40b, which is opposite to the end on the side of the phase terminal (or the side of the neutral point), via the slot-accommodation portion 43 that is the return portion 46. The same connecting method is used for the individual phases of the windings 40.

Hereinafter is described the method of manufacturing a stator coil according to the first embodiment. Specifically, the stator coil 4 is manufactured as will be described below. In the following description of the manufacturing method, a radial direction refers to the radial direction of a core member or a wound-up body, and a circumferential direction refers to the circumferential direction of the core member or the wound-up body.

<Shaping Step>

First, twelve shaped wire members are formed from twelve electrically conductive wires. Each of the shaped wire members formed here has a plurality of straight portions 431 extending parallel to each other and juxtaposed in the longitudinal direction of the shaped wire member, and a plurality of turn portions 44 alternately connecting adjacent straight portions 431 at one end and the other end of each of the straight portions 431.

<Integrating Step>

The integrated body 47 is formed by integrating the twelve shaped wire members. In the integrated body 47, six pairs of windings are juxtaposed in the longitudinal direction of the integrated body 47. Each pair of windings consists of a first wire portion as the first winding 40a and a second wire portion as the second winding 40b. It should be appreciated that the first wire portion is made up of one shaped wire member and the second wire portion is also made up of one shaped wire member.

The joint 45 is provided by welding and joining an end of the first wire portion and an end of the second wire portion in each pair of windings. The twelve shaped wire members may be integrated first, followed by joining an end of the first wire portion and an end of the second wire portion. Alternatively, six pairs of windings may first be formed by joining an end of the first wire portion and an end of the second wire portion, followed by integrating the six pairs of windings.

Each of the pairs of windings in the integrated body 47 has a plurality of straight superposed portions 471 in the longitudinal direction of the integrated body 47. The straight superposed portions 471 are formed by superposing the plurality of straight portions 431 in the first wire portion with the plurality of respective straight portions 431 in the second wire portion. However, six straight portions including the return portions 46, which serve as a winding start and six straight portions 431 which serve as a winding end in a winding step that will be described later, are not superposed with other straight portions 431. Therefore, the straight portions 431 from the one indicated by "A" to the one indicated by "B" at the right end (winding start) of FIG. 8 are not superposed with other straight portions 431.

<Winding Step>

The integrated body 47 is wound up by a predetermined number of winding turns (e.g., three or four winding turns), so that the return portions 46 will be positioned on the side of the axis, thereby forming the wound-up body 48 shown in FIG. 7. In this case, the integrated body 47 is wound up with the turn portions 44 being plastically deformed, so that a predetermined winding radius is achieved. Details of the winding step will be described later.

The wound-up body 48 has a plurality of straight stack portions 481 in the circumferential direction of the wound-up body 48. Each of the straight stack portions 481 is formed by radially stacking a plurality of straight superposed portions 471 in one pair of windings by the number corresponding to the number of winding turns. In each straight stack portion 481, the straight portions 431 twice of the number of winding turns are superposed for alignment in the radial direction. In this case, the straight stack portions 481 are positioned along the circumferential direction of the wound-up body 48 with small intervals therebetween.

The segment cores 32 are inserted from radially outside into the wound-up body 48 obtained in this way, in such a way that the teeth portions 320 are inserted into gaps between adjacent straight stack portions 481 and that adjacent segment cores 32 are mutually connected to thereby provide the stator 3.

Figure 9A:
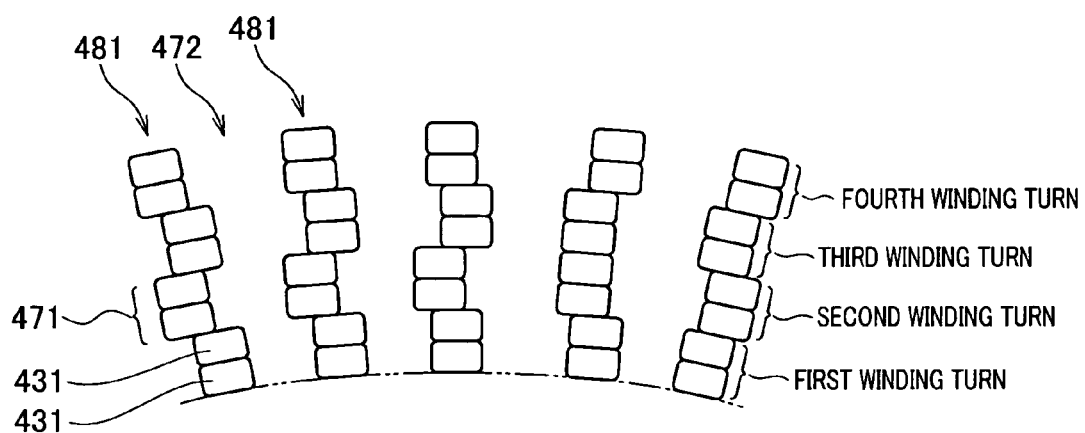
FIG. 9A is an explanatory view illustrating alignment of straight stack portions at a winding step, or a view illustrating insufficient alignment resulting from a conventional winding step.
Figure 9B:
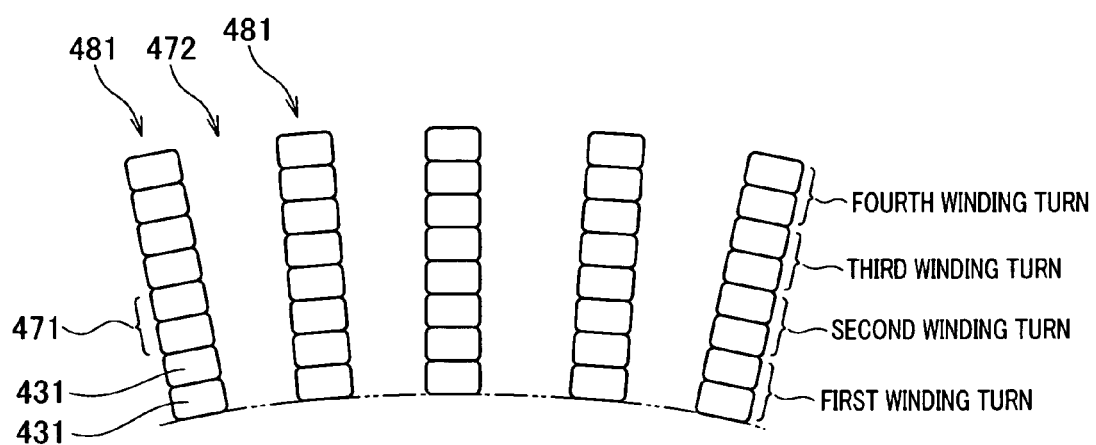
FIG. 9B is an explanatory view illustrating alignment of straight stack portions at a winding step, or a view illustrating a state of alignment according to the first embodiment.

With reference to the drawings, hereinafter is described in detail the winding step in the method of manufacturing a stator coil of the present embodiment. First, alignment of the straight stack portions 481 in the winding step is described. FIGS. 9A and 9B are explanatory views, each illustrating the alignment of the straight stack portions 481 in the winding step. In particular, FIG. 9A illustrates a state of insufficient alignment according to a conventional winding method, and FIG. 9B illustrates a state of alignment according to the first embodiment. The straight portions 431 are mutually superposed to provide the straight superposed portions 471, and the straight portions 431 or the straight superposed portions 741 are stacked to form the straight stack portions 481.

Conventionally, circumferential offset has been caused at each of the straight superposed portions 471 as shown in FIG. 9A. Therefore, it has been difficult to achieve an alignment in each of the straight stack portions 481. Accordingly, gaps 472 formed between the straight superposed portions 471 have been irregularly shaped in the radial direction, in which case, insertion of the teeth portions 320 of the segment cores 32 has been disabled.

In this regard, according to the first embodiment, the straight superposed portions 481 can be easily aligned as shown in FIG. 9B. Accordingly, this will exert an advantage that the gaps 472 formed between the straight superposed portions 471 are regularly shaped to enable easy insertion of the teeth portions 320 of the segment cores 32.

Figure 10:
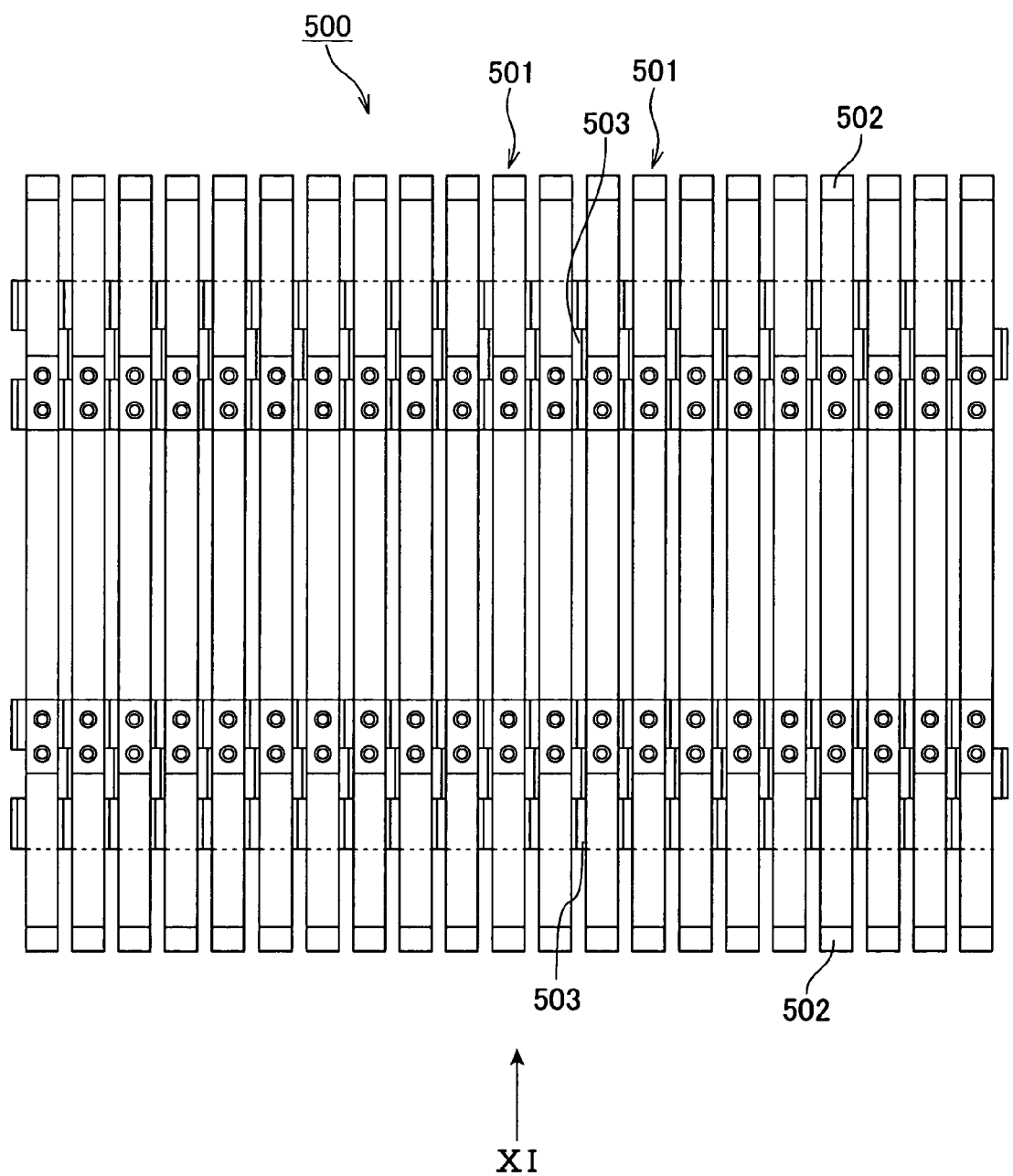
FIG. 10 is a plan view illustrating an alignment member used in the first embodiment.
Figure 15:
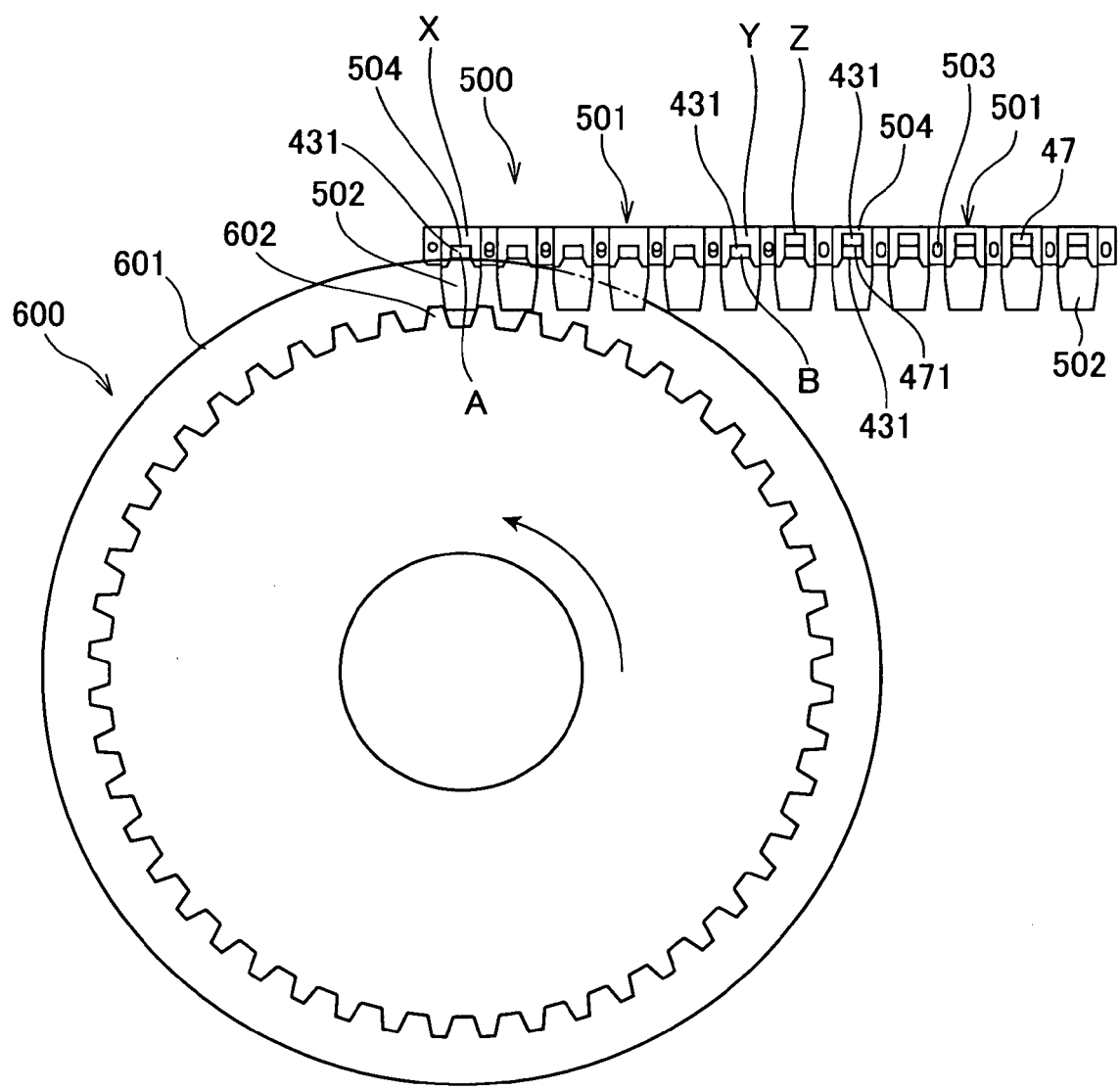
FIG. 15 is a side view illustrating a state where the integrated body is started to be wound about a core member used in the first embodiment.

In forming the wound-up body 48 from the integrated body 47 at the winding step according to the first embodiment, an alignment member 500 as a winding jig as shown in FIG. 10, for example, and a core member 600 as shown in FIG. 15, for example, are used.

Figure 11:
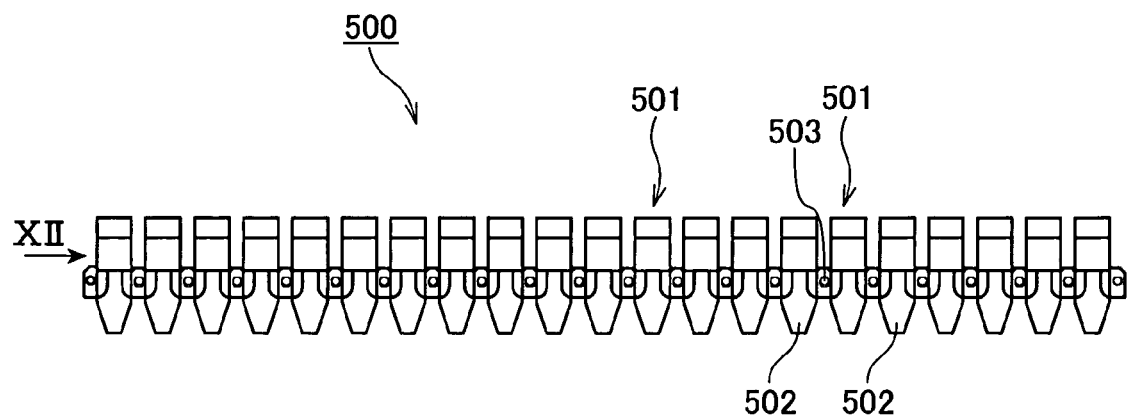
FIG. 11 is a side view illustrating the alignment member illustrated in FIG. 10, as viewed from a direction XI.
Figure 12:
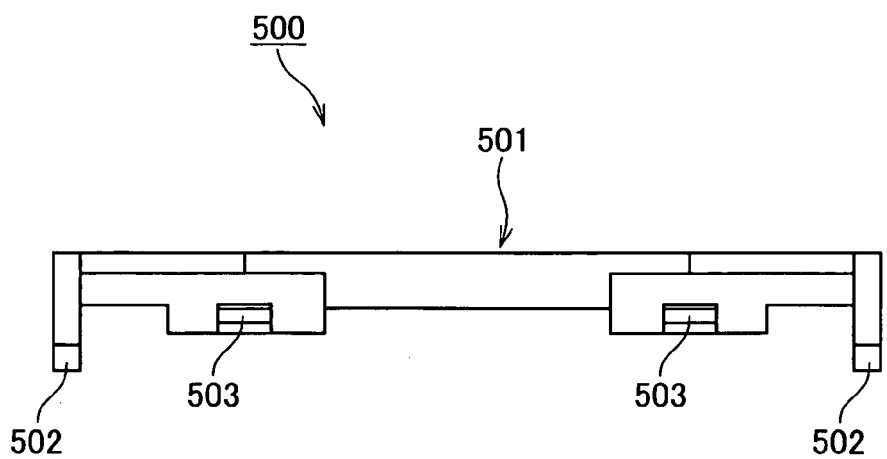
FIG. 12 is a side view illustrating the alignment member illustrated in FIG. 11, as viewed from a direction XII.
Figure 13:
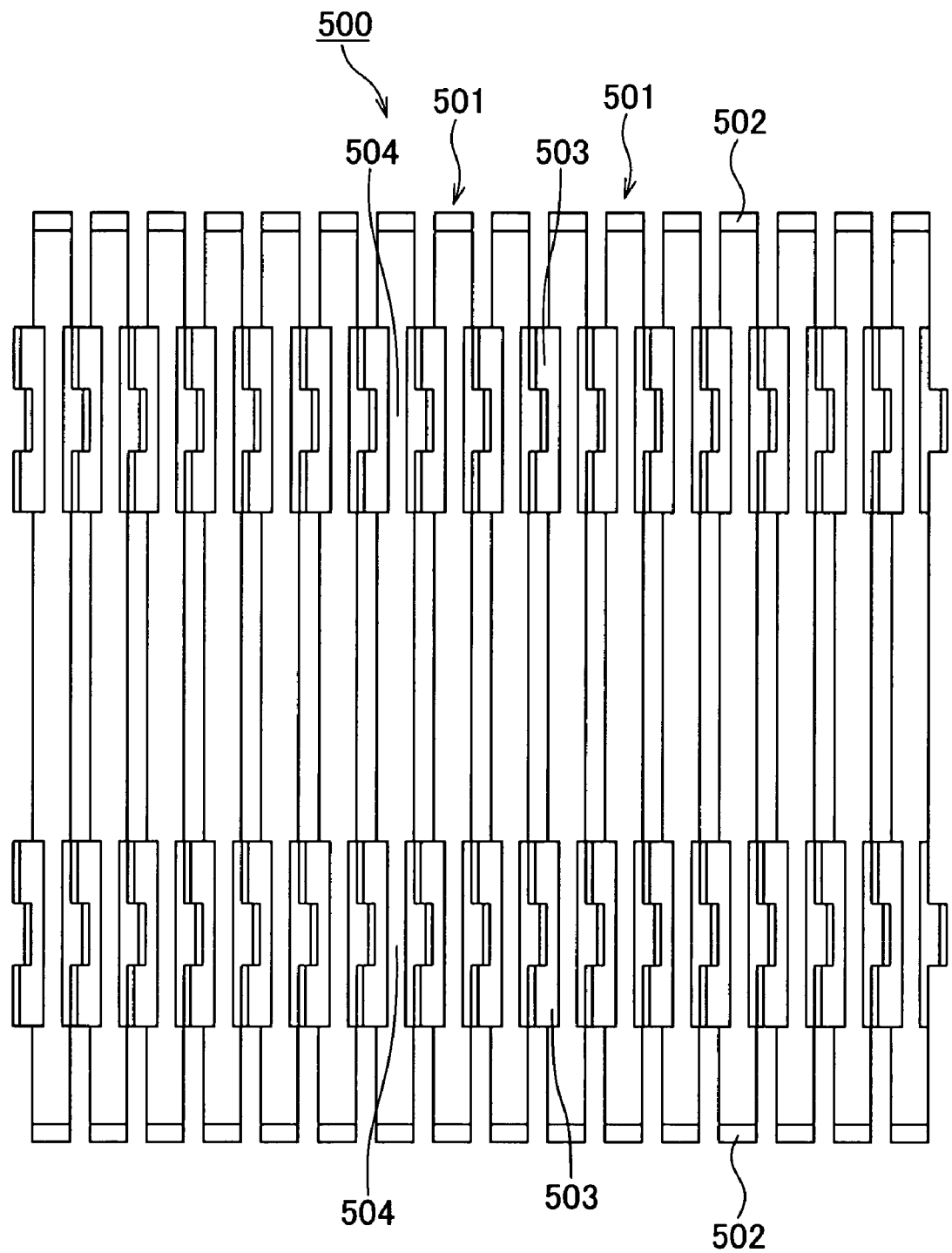
FIG. 13 is a bottom plan view of the alignment member illustrated in FIG. 10.
Figure 14:
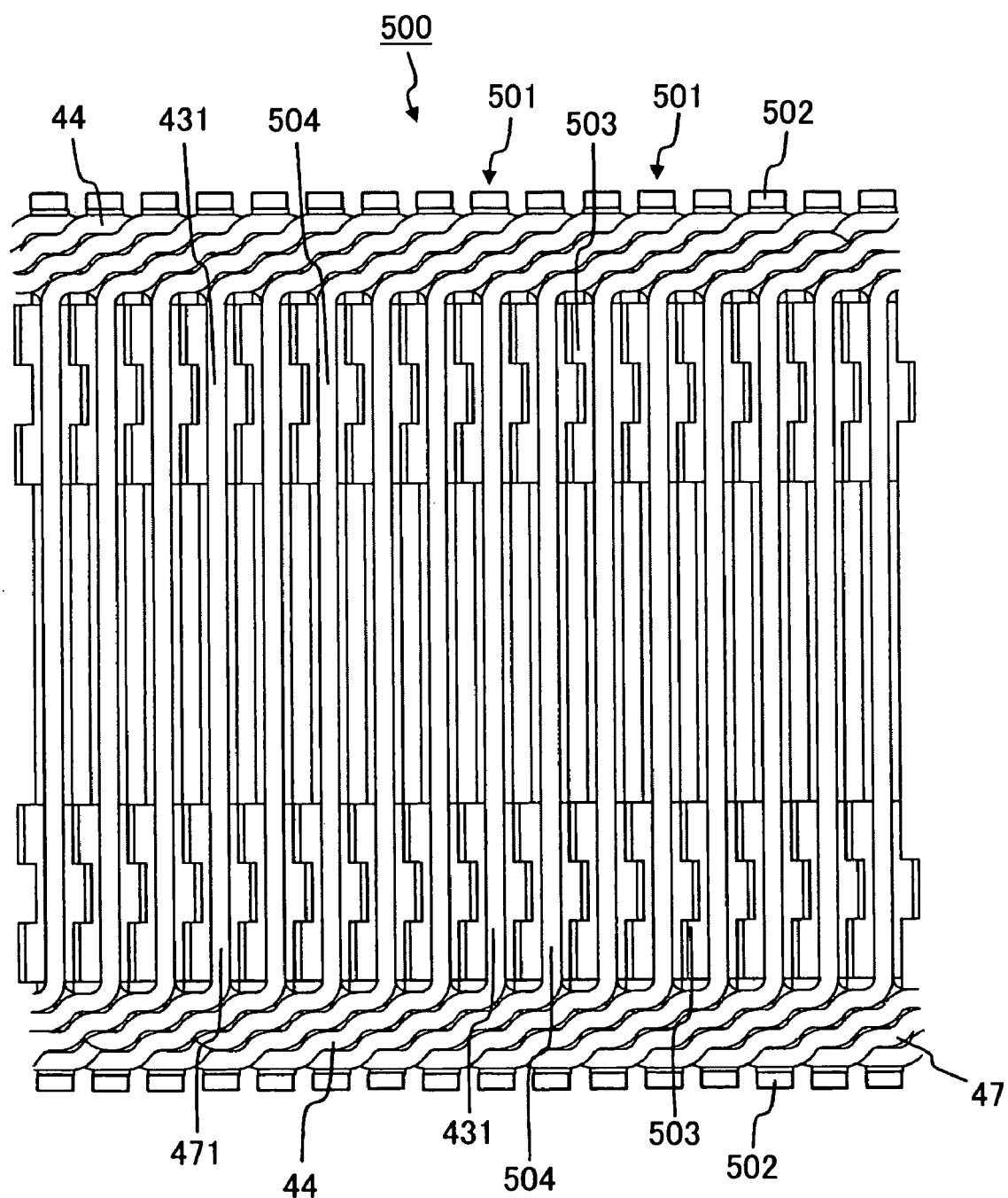
FIG. 14 is a bottom plan view illustrating a state where the integrated body has been fitted to the alignment member illustrated in FIG. 13.

FIG. 10 is a plan view illustrating the alignment member 500 used in the first embodiment. FIG. 11 is a side view illustrating the alignment member 500 illustrated in FIG. 10, as viewed from a direction XI. FIG. 12 is a side view of the alignment member 500 illustrated in FIG. 11, as viewed from a direction XII. FIG. 13 is a bottom plan view illustrating the alignment member 500 illustrated in FIG. 10. FIG. 14 is a bottom plan view illustrating a state where the integrated body 47 has been fitted to the alignment member 500 illustrated in FIG. 13.

Figure 16A:
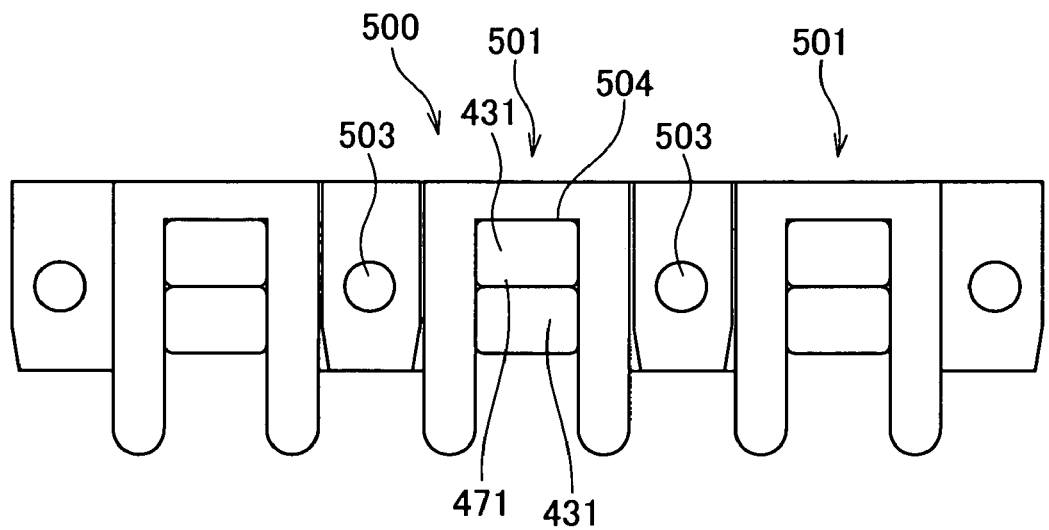
FIG. 16A is a side view illustrating a connecting structure for establishing connection between straight portion fixing members constituting the alignment member, or a view illustrating a state where bottom faces of the fitted straight portions are substantially made horizontal.
Figure 16B:
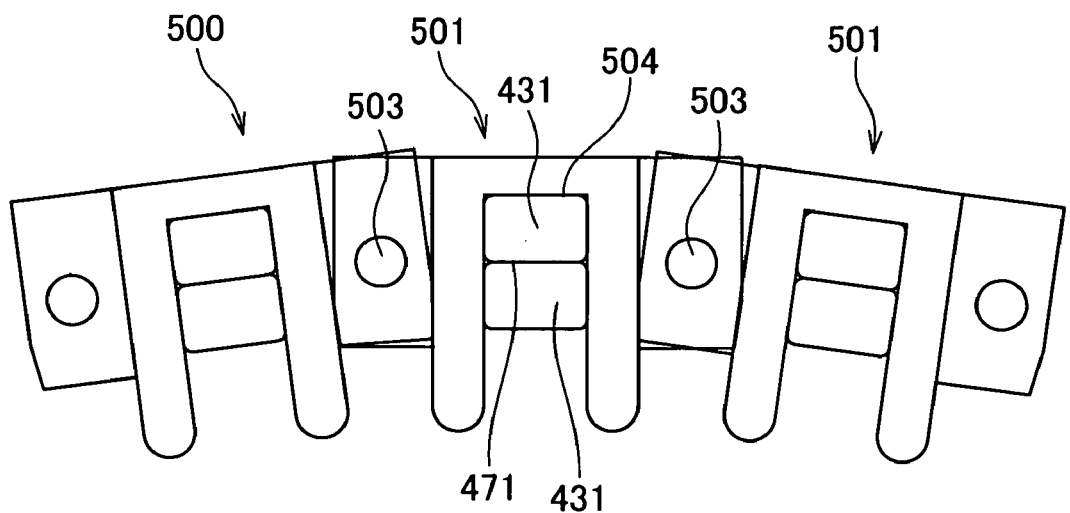
FIG. 16B is a side view illustrating a connecting structure for establishing connection between straight portion fixing members constituting the alignment member, or a view illustrating a state where bottom faces of the fitted straight portions are adjusted to the winding face of the core member.
Figure 17:
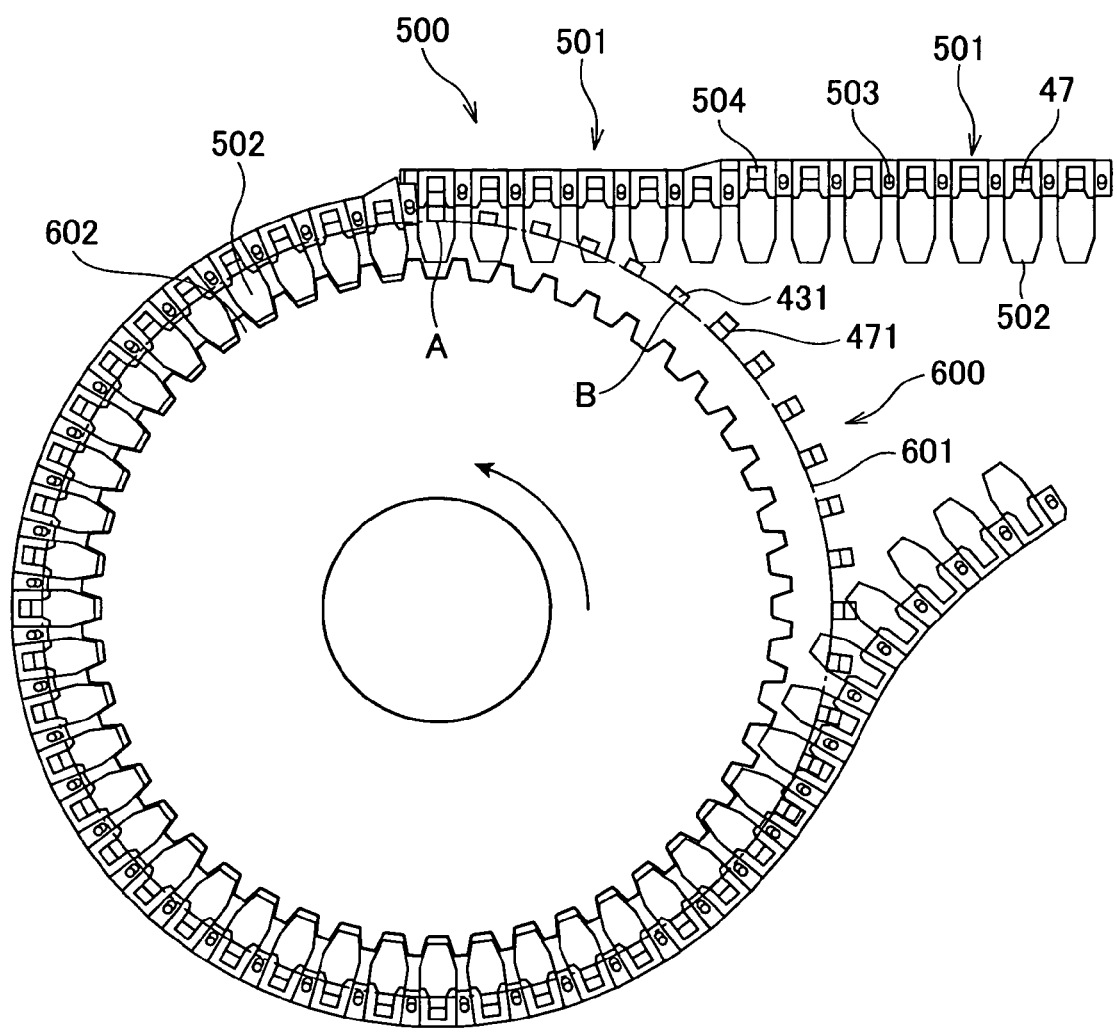
FIG. 17 is a side view illustrating a state where the integrated body is being wound about the core member and is on the point of being started with the second winding turn.

FIG. 15 is a side view illustrating a state where the integrated body 47 is started to be wound about the core member 600 used in the first embodiment. FIG. 17 is a side view illustrating a state where the integrated body 47 is being wound about the core member 600 and is on the point of being started with the second winding turn. FIGS. 16A and 18B are side views each illustrating a connecting structure that establishes connection between straight portion fixing members 501 constituting the alignment member 500. In particular, FIG. 16A illustrates a state where bottom faces of the fitted straight portions 431 are substantially made horizontal, and FIG. 16B illustrates a state where bottom faces of the fitted straight portions 431 are adjusted to the winding face of the core member.

As shown in FIGS. 10, 11 and 12, the alignment member 500 is configured by connecting a plurality of the straight portion fixing members 501 using connecting members 503. Both ends of each straight portion fixing member 501 have projections 502 that engage with gears 602 provided at the core member 600 to form winding gears.

As shown in FIGS. 13 and 14, each of the plurality of straight portion fixing members 501 has a fitting groove 504 to which the straight portions 431 of the integrated body 47 can be fitted. The interval between adjacent fitting grooves 504 is set to a size which can provide alignment in each straight stack portion 481 as shown in FIG. 9B when the integrated body 47 has been wound about the core member 600.

In the winding step according to the first embodiment, the straight portions 431 of the integrated body 47 are fitted, first, to the fitting grooves 504 provided at the respective straight portion fixing members 501 of the alignment member 500 to thereby form a fitted body in which the alignment member 500 and the integrated body 47 are integrated.

Then, as shown in FIG. 15, the fitted body that is an integration of the alignment member 500 and the integrated body 47 is fed to the core member 600. With the feeding of the fitted body, the core member 600 is rotated counterclockwise as indicated by an arrow in FIG. 15.

The core member 600 is cylindrically shaped and has circular faces at both ends, which are provided with the gears 602 that can engage with the projections 502 provided at both ends of each straight portion fixing member 501. The curvature of a winding face 601 of the core member 600 depends on the inner diameter of the wound-up body 48.

In feeding the fitted body that is an integration of the alignment member 500 and the integrated body 47 toward the core member 600, a guide rail may be used. The guide rail may have the same width as that of the winding face 601 of the core member 600 (the distance between the gears 602 at both ends), so that the fitted body is ensured to be fed to the core member 600 along the guide rail. In this way, possible widthwise offset between the core member 600 and the fitted body can be prevented.

As shown in FIGS. 16A and 16B, each of the plurality of straight portion fixing members 501 is connected to the adjacent straight portion fixing member 501 via the connecting member 503. The connecting members 503 can change the angle between adjacent straight portion fixing members 501. It should be appreciated that, in FIGS. 16A and 16B, illustration of the projections 502 is omitted for easy viewing.

In fitting the straight portions 431 to each of the fitting grooves 504, the alignment member 500 is permitted to stand in the state shown in FIG. 16A, i.e. a substantially horizontal state, to easily perform the fitting. Also, in winding the integrated body 47 about the winding face 601 of the core member 600, the angle between adjacent straight portion fixing members 501 of the alignment member 500 is adjusted as shown in FIG. 16B, i.e. adjusted to the curvature of the winding face 601 of the core member 600, to bring the straight portions 431 fitted to the straight portion fixing members 501 into contact with the winding face 601.

FIG. 17 illustrates a state where winding turns of the integrated body 47 has progressed with the counterclockwise rotation of the core member 600 in feeding the fitted body, and where one winding turn has been completed.

With the first winding turn, the straight portions 431 are directly provided onto the winding face 601. With the second and the subsequent winding turns, the straight portions 431 are provided onto the respective straight portions 431 that have already been provided onto the winding face 601. Therefore, if the distance between adjacent fitting grooves 504 remains unchanged, each straight stack portion 481 may not be aligned (see FIG. 9B) in the radial direction from the center of the core member 600. To take measure for this, in the first embodiment, adjustment is made in the distance between adjacent fitting grooves 504, according to the radial winding position of the straight portions 431. At the same time, the projections 502 are differentiated in the length to ensure adjustment of the radial positions of the straight portions 431. With these adjustments, alignment can be achieved in each of the straight stack portions 481 of the wound-up body 48 in the radial direction from the center of the core member 600.

Further, as described above, the straight portions 431 located at the winding start in the integrated body 47 (the straight portions 431 from the ones indicated by "A" to the ones indicated by "B" at the right end of FIG. 8) are not superposed with other straight portions 431. Therefore, as shown in FIGS. 15 and 17, each of the straight portions 431 indicated from "A" to "B", is solely provided to the core member 600 during the winding turn, and from the next straight portion onward, the straight superposed portions 471 are provided during the winding turns. For this reason, the depth of the fitting grooves 504 in the fitting direction is differentiated between the straight portion fixing members 501 indicated from "X" to "Y", into which the straight portions 431 are each solely fitted, and the straight portion fixing member 501 indicated by "Z", into which the straight superposed portions 471 are fitted, thereby ensuring adjustment of the depthwise size for fitting the straight portions 431.

The alignment member 500 is consecutively removed from the fitted body that has been wound about the core member 600, so that only the integrated body 47 remains on the winding face 601 of the core member 600 and is continuously wound up to eventually obtain the wound-up body 48.

(Second Embodiment)

Figure 18:
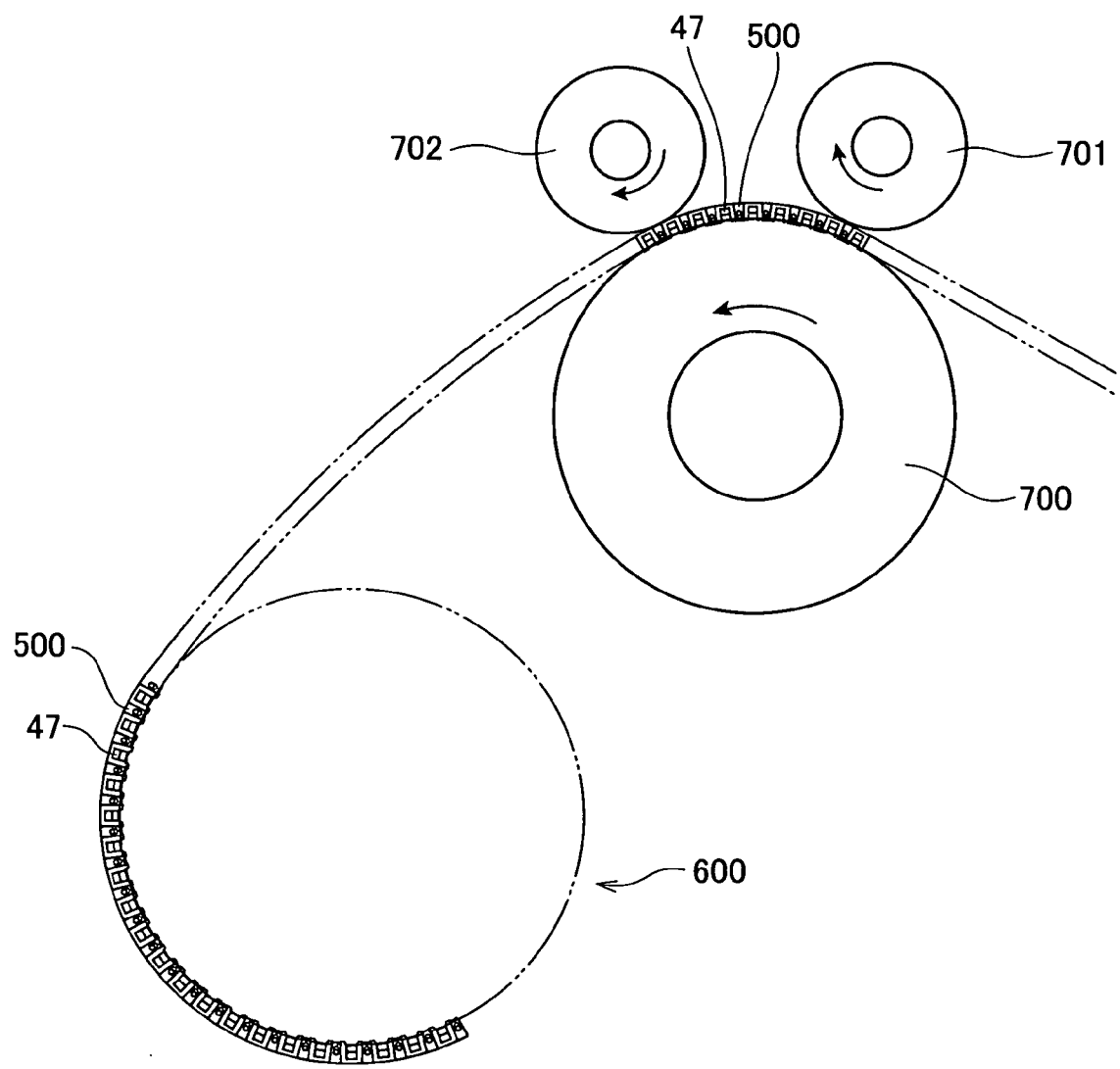
FIG. 18 is a side view illustrating a configuration for performing round shaping as a pre-process prior to winding an integrated body about a core member in a second embodiment of the present invention.

Referring now to FIG. 18, hereinafter will be described a second embodiment of a method of manufacturing a stator coil related to the present invention. In the present and the subsequent embodiments, the components having functions identical with or similar to those in the first embodiment described above are designated with the same references to omit or simplify the descriptions.

In the first embodiment described above, no particular processes have been performed from when the integrated body 47 has been fitted to the alignment member 500 to when the integrated body 47 is wound about the core member 600. However, the present invention is not intended to be limited to this, but may be configured differently. Specifically, as a pre-process prior to winding the integrated body 47 about the core member 600, the integrated body 47 may be subjected to round shaping (curve shaping) to cope with the curvature of the winding face 601. FIG. 18 is a side view illustrating a configuration for performing round shaping as a pre-process prior to winding the integrated body 47 about the core member 600.

In the second embodiment, the integrated body 47 is fitted to the alignment member 500 to form the fitted body. Then, the fitted body is inserted between a round shaping die 700 and punch rollers 701 and 702 to give round shaping chiefly to the turn portions 44 (coil end).

According to the second embodiment, round shaping is effected to the integrated body 47 in advance according to the curvature of the winding face 601 of the core member 600. The round shaping can mitigate the tension against the winding turns in winding the integrated body 47 about the core member 600, whereby the winding operation can be easily performed.

The curvature used in the round shaping performed by means of the round shaping die 700 and the punch rollers 701 and 702 may be differentiated between the winding start and the winding end. For example, as to the winding start portion, round shaping may be performed with a curvature equal to or less than the curvature of the winding face 601 (in a smooth curving manner) to prevent the winding start portion from entering into the side of the center than the inner periphery of the wound-up body 48, when the wound-up body 48 has been demounted from the core member 600. As to the winding end portion, round shaping may be performed with a curvature equal to or more than the curvature of the winding face 601 (in a sharp curving manner) to prevent the winding end portion from offsetting outside than the outer periphery of the wound-up body 48.

The round shaping as a pre-process prior to performing winding may be effected to the integrated body 47 before being integrated into the alignment member 500. However, it is desirable the integrated body 47 be fitted to the alignment member 500 before effecting round shaping, because the integrated body 47 before being rounded can facilitate the fitting operation.

(Third Embodiment)

Figure 19:
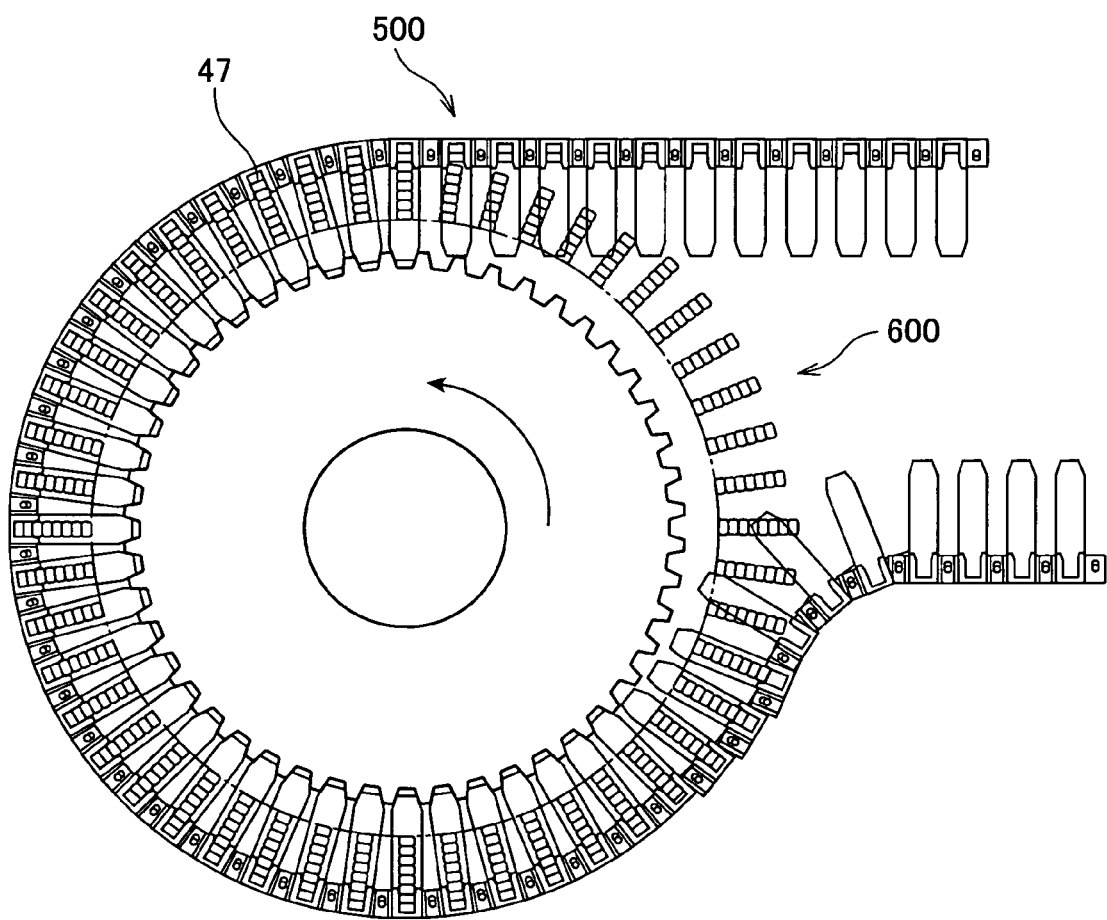
FIG. 19 is a side view illustrating a state where an integrated body is being wound about a core member and the first winding turn has been completed in a third embodiment of the present invention.

Referring now to FIG. 19, hereinafter is described a third embodiment of a method of manufacturing a stator coil related to the present invention.

In the first embodiment described above, a plurality of integrated bodies have been fitted to the alignment member 500 first, and then wound about the core member 600 with a plurality of winding turns. In the third embodiment, however, the integrated body 47 is divided in advance into pieces each of which corresponds to one winding turn. The plurality of pieces of divided integrated body 47 are fitted to the alignment member 500 and then wound about the core member 600. Compared to the first embodiment, this can reduce the number of winding turns imparted to the core member 600. Further, compared to the first embodiment, the pieces of integrated body, each of which has been divided to have a length corresponding to that of each winding turn, can be located in a compact space to thereby additionally exert an advantage of reducing the size of the facilities. FIG. 19 illustrates a state where a plurality of pieces of integrated body 47 are being wound about the core member 600 and one winding turn has been completed.

(Fourth Embodiment)

Referring to FIGS. 20 to 25, hereinafter is described a third embodiment of a method of manufacturing a stator coil related to the present invention.

The fourth embodiments provides a method of stable conveyance in conveying the alignment member 500 and the integrated body 47 toward the core member 6 at the step of winding the integrated body 47 about the core member 6 using the alignment member 500, as described in each of the above embodiments.

Figure 20:
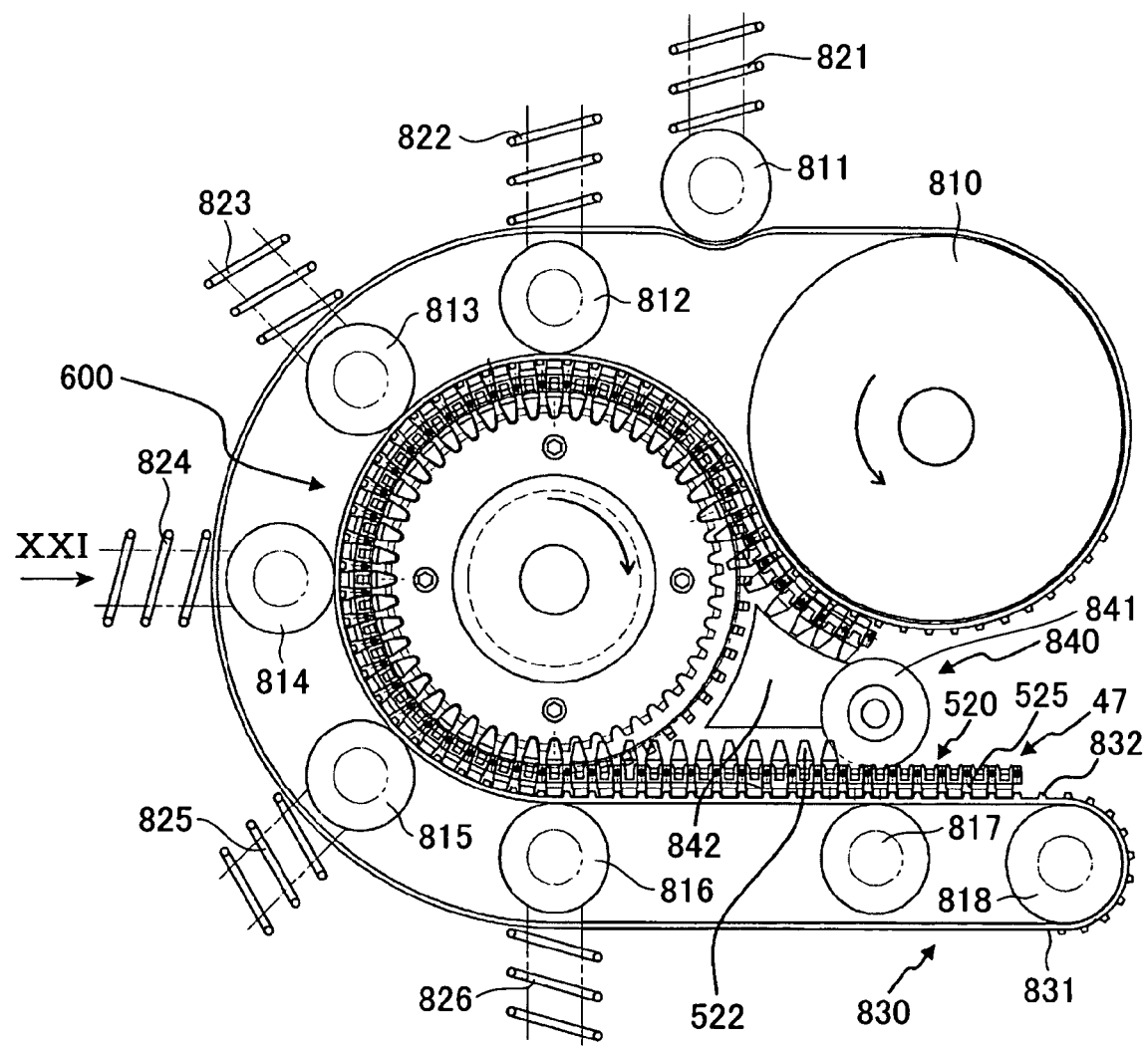
FIG. 20 is a schematic side view illustrating a state where an integrated body is being conveyed to a core member and the first winding turn has been completed according to a fourth embodiment of the present invention.

FIG. 20 is a schematic side view illustrating a state where the integrated body 47 is being conveyed to the core member 600 and the first winding turn has been completed in the fourth embodiment. In the fourth embodiment, since the configurations of the core member 600 and the integrated body 47 are similar to those in the embodiments described above, the same references are used. Also, in the fourth embodiment, an alignment member 520 is used instead of the alignment member 500.

In the fourth embodiment, an endless conveyor belt 830 is mounted on a drive roller 810 and a control roller 818. The drive roller 810 is rotated counterclockwise, so that the integrated body 47 (in the state of being fitted to the alignment member 520) located on the conveyor belt 830 on the side of the control roller 818 is conveyed toward the core member 600 and wound up. The embodiments described above have each exemplified that the core member 600 is rotated counterclockwise to wind up the integrated body 47. In the fourth embodiment, however, the core member 600 is rotated clockwise to wind up the integrated body 47.

In order to adjust the position of the conveyor belt 830, control rollers 812, 813, 814, 815, 816 and 817 are provided between the drive roller 810 and the control roller 818. The control rollers 812, 813, 814, 815 and 816 are pressed by spring members 822, 823, 824, 825 and 826, respectively, each made up of a coil spring or the like, against the core member 600 in the radially inward direction. Also, the conveyor belt 830 is being subjected to tension adjustment using a tension roller 811 having a spring member 821 made up of a coil spring or the like.

A separator/presser member 840 consists of a moving roller 840 and an end portion 842, and has a function of separating the alignment member 520 from the integrated body 47 after the integrated body 47 and the alignment member 520 have been integrally wound about the winding face 601 of the core member 600, and of pressing the integrated body 47 after being separated so as not to float on the winding face 601. Also, the separator/presser member 840 is configured so as to be movable according to the height of the straight portions 431 already provided on the winding face 601 by winding turns.

A belt 831 constituting the conveyor belt 830 is provided with projections 832 at the outer sides of its endless body. The alignment member 520 has recesses 525 that engage with the respective projections 832 and form conveyor gears. The conveyor gears contribute to stable and reliable conveyance of the integrated body 47 fitted to the alignment member 520, with the conveyor belt 830. There may be provided a mechanism which ensures engagement between the inner side of the endless body of the belt 831 and the outer periphery of the drive roller 810 for reliable transmission of the driving force.

Figure 21:
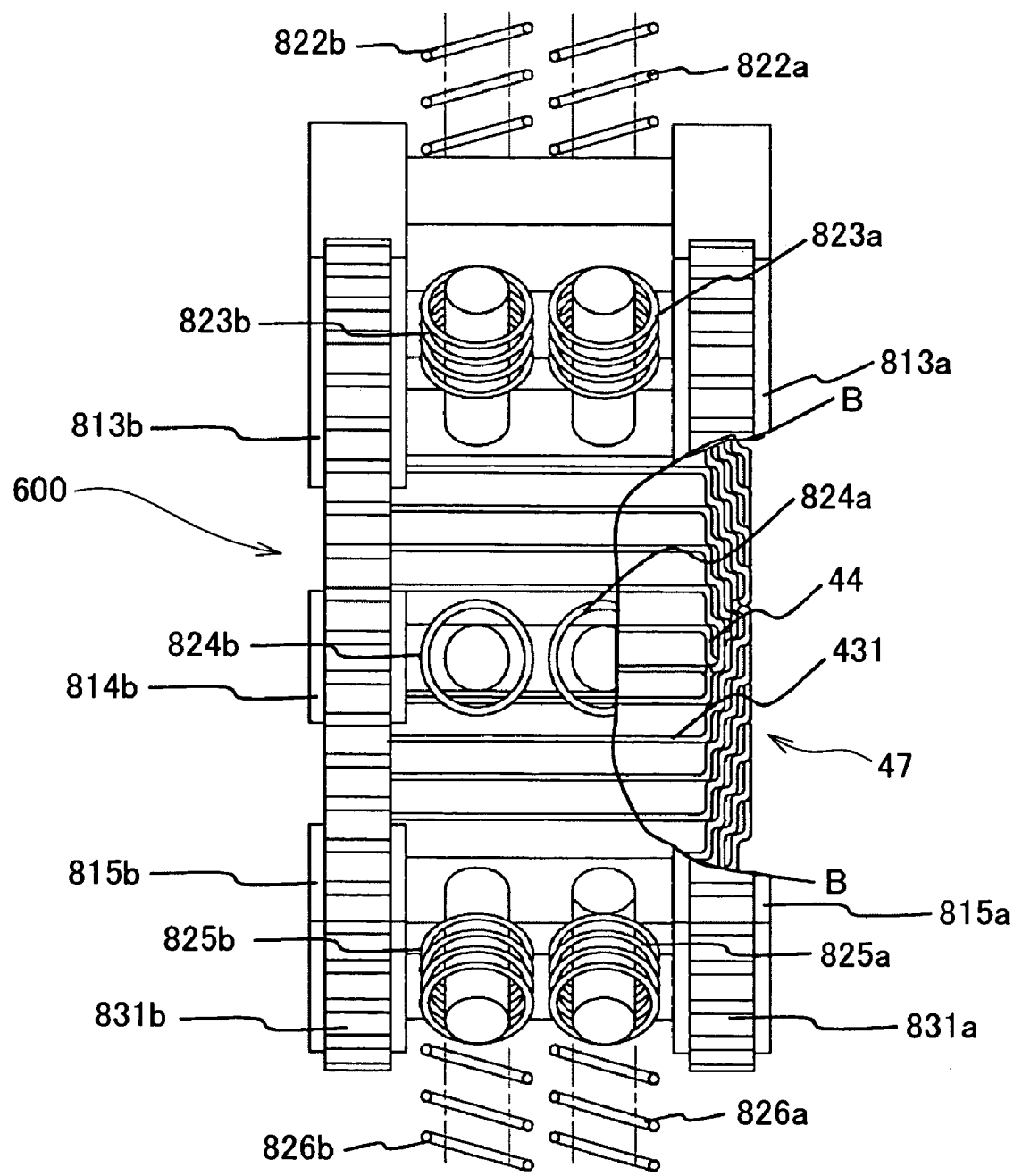
FIG. 21 is a schematic side view illustrating the state illustrated in FIG. 20, as viewed from a direction XXI.

FIG. 21 is a schematic side view as viewed from a direction XXI of FIG. 20. Using a break line B-B in FIG. 21, the belt, the roller and the alignment member are partially removed so that the turn portions 44 of the integrated body 47 can be seen.

In the fourth embodiment, belts 831a and 831b are provided to serve as the belt 831. The belts 831a, 831b are each adapted to support the turn portions 44 of the integrated body 47 in position, for conveyance. In this way, by providing the structure where the belt 831 is divided for location on both sides, the spring members can be provided between the belts on both sides. For example, control rollers 815a and 815b are provided to serve as the control roller 815, and spring members 825a and 825b serving as the spring member 825 are provided at shafts between the rollers 815a and 815b to impose spring force. Other control rollers 812, 813, 814 and 816 as well as other spring members 822, 823, 824 and 826 are configured in the similar manner.

Figure 22A:
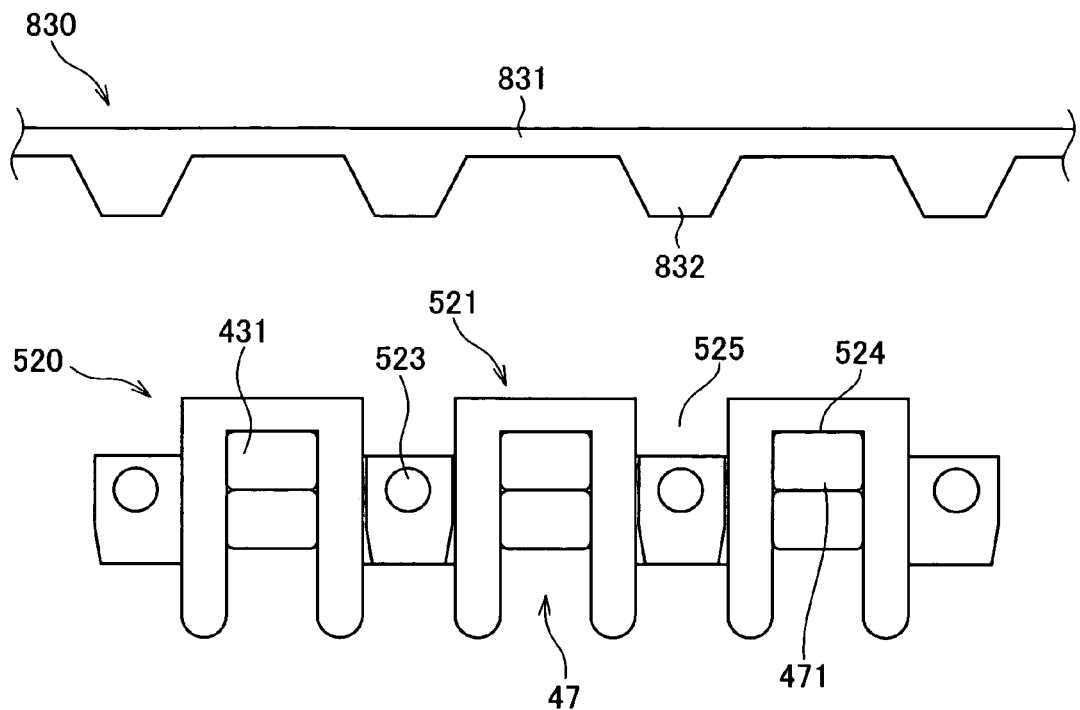
FIG. 22A is a side view illustrating a connecting structure for establishing connection between straight portion fixing members constituting an alignment member and illustrating engagement between recesses of the alignment member and projections of a conveyor belt, in a state where bottom faces of fitted straight portions are made horizontal.
Figure 22B:
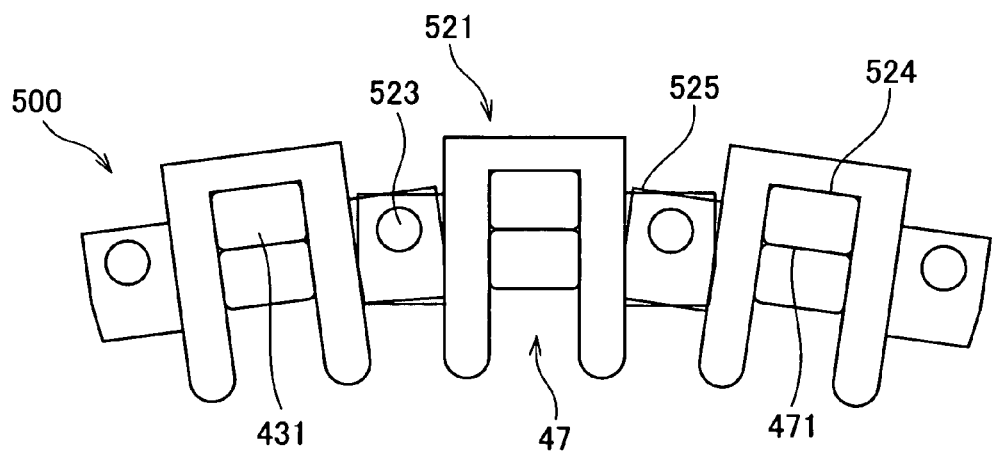
FIG. 22B is a side view illustrating a connecting structure for establishing connection between straight portion fixing members constituting an alignment member and illustrating engagement between recesses of the alignment member and projections of a conveyor belt, in a state where bottom faces of the fitted straight portions are adjusted to a winding face of the core member.

FIGS. 22A and 22B are side views illustrating a connecting structure between straight portion fixing members 521 constituting the alignment member 520 and illustrating an engagement between the recesses 525 of the alignment member 520 and the projections 832 of the conveyor belt 830. In particular, FIG. 22A illustrates a state where the bottom faces of the fitted straight portions 431 are made substantially horizontal, and FIG. 22B illustrates a state where the bottom faces of the fitted straight portions 431 are adjusted to the winding face of the core member 600. The alignment member 520 is configured by connecting a plurality of straight portion fixing members 521 via connecting members 523. Both ends of each straight portion fixing member 521 have projections 522 that engage with the gears 602 provided at the core member 600 and form winding gears. Also, each of the plurality of straight portion fixing members 521 has a fitting groove 524 that is fitted with the straight portions 431 of the integrated body 47. Further, the recesses 525 are each formed between adjacent straight portion fixing members 521. The projections 832 of the conveyor belt 830 are provided at the positions for enabling engagement with the respective recesses 525.

As shown in FIGS. 22A and 22B, each of the plurality of straight portion fixing members 521 is connected to its adjacent straight portion fixing member 521 via the connecting member 523. The angle between adjacent straight portion fixing members 521 can be changed by the connecting member 523. In FIGS. 22A and 22B, illustration of the projections 522 is omitted for easy viewing.

In fitting the straight portions 431 in each of the fitting grooves 524, the alignment member 520 is brought into the state shown in FIG. 22A, i.e. substantially a horizontal state, so that fitting can be conducted in a state that facilitates fitting. In winding the integrated body 47 about the winding face 601 of the core member 600, the angle between adjacent straight portion fixing members 521 of the alignment member 520 is adjusted as shown in FIG. 22B, i.e. adjusted to the curvature of the winding face 601 of the core member 600. With this adjustment, the straight portions 431 fitted to the straight portion fixing members 521 are ensured to be brought into contact with the winding face 601.

Figure 23:
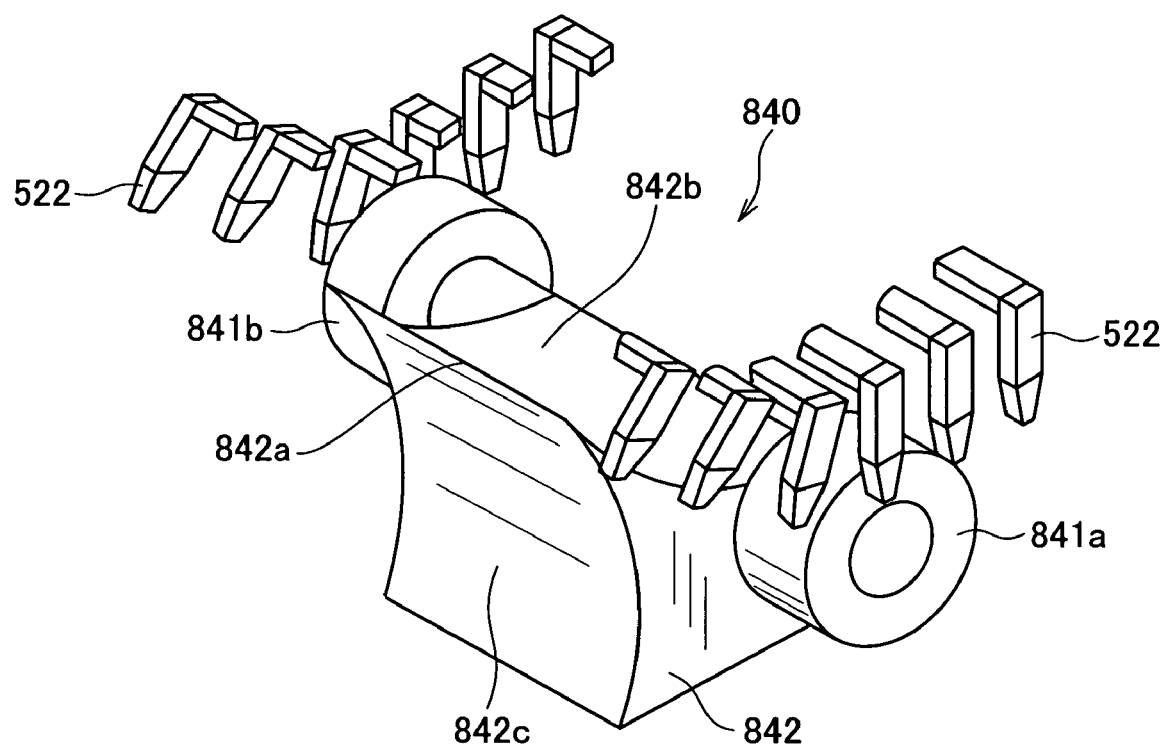
FIG. 23 is a schematic perspective view illustrating a separator/presser member illustrated in FIG. 20.

FIG. 23 is a schematic perspective view of the separator/presser member 840 illustrates in FIG. 20. The separator/presser member 840 has rollers 841a and 841b that serve as the moving roller 841 and has the end portion 842. The end portion 842 is configured by being provided with: a sharp end 842a that separates the alignment member 520 from the integrated body 47 after the integrated body 47 and the alignment member 520 have been integrally wound about the winding face 601 of the core member 600; a guide face 842b that guides the separated alignment member 520; and a presser face 842c that presses the integrated body 47 after separation so as not to float on the winding face 601.

The end portion 842 is so configured to enable adjustment of the position of separation performed by the sharp end 842a and the position of pressing performed by the presser face 842c. In particular, the end portion 842 is enabled movements by the moving roller 841 and a vertical movement mechanism, not shown. With these movements, the positions of separation and pressing can be adjusted according to the height of the straight portions 431 already provided at the winding face 601 of the core member 600 by the winding turns.

Hereinafter is described a winding step according to the fourth embodiment. At the winding step according to the fourth embodiment, the straight portions 431 of the integrated body 47 are fitted, first, to the respective fitting grooves 524 provided at the respective straight portion fixing members 521 of the alignment member 520 to integrate the alignment member 520 and the integrated body 47, for formation of a fitted body.

Then, the fitted body is mounted on the conveyor belt 830 located below the moving roller 841 shown in FIG. 20. In this case, the recesses 525 of the alignment member 520 are ensured to be directed downward for engagement with the projections 832 of the conveyor belt 830.

Then, upon switch-on of a drive switch, not shown, the core member 600 starts clockwise rotation and the drive roller 810 starts counterclockwise rotation to convey the integrated body to the position where the core member 600 is located. Continuous rotation of the drive roller 810 allows the projections 522 of the alignment member 520 to engage with the gears 602 of the core member 600 to thereby progress the winding turns. In this case, the control rollers 812, 813, 814, 815 and 816 biased by the spring members 822, 823, 824, 825 and 826, respectively, press the fitted body against the core member in the radially inward direction through the conveyor belt 830 to prevent the fitted body from floating outside.

The rotational speed of the drive roller 810 is determined according to the rotational speed of the core member 600 and according to the radial position on the winding face 601 of the core member 600, where winding turn is actually performed. Specifically, the rotational speed of the driver roller 810 is determined, so that conveyance is performed by the conveyor belt 830, being adjusted to the speed of advance of the fitted body, i.e. the integrated body 47, at this radial position. The rotational speed of the drive roller 810 is controlled by a control unit, not shown.

Then, with the continuous rotation of the core member 600 and the drive roller 810, the fitted body will eventually reach the position where the sharp end 841b is located. The sharp end 841b is thrust between the integrated body 47 and the alignment member 520 to separate therebetween, with the continuous rotation of the core member 600 and the drive roller 810. The separated alignment member 520 is discharged along the guide face 842b, while the separated integrated body 47 is left as it is on the winding face 601 of the core member 600 and wound up. While being wound up, the integrated body 47 is pressed by the presser face 842c so as not to float on the winding face 601.

Figure 24:
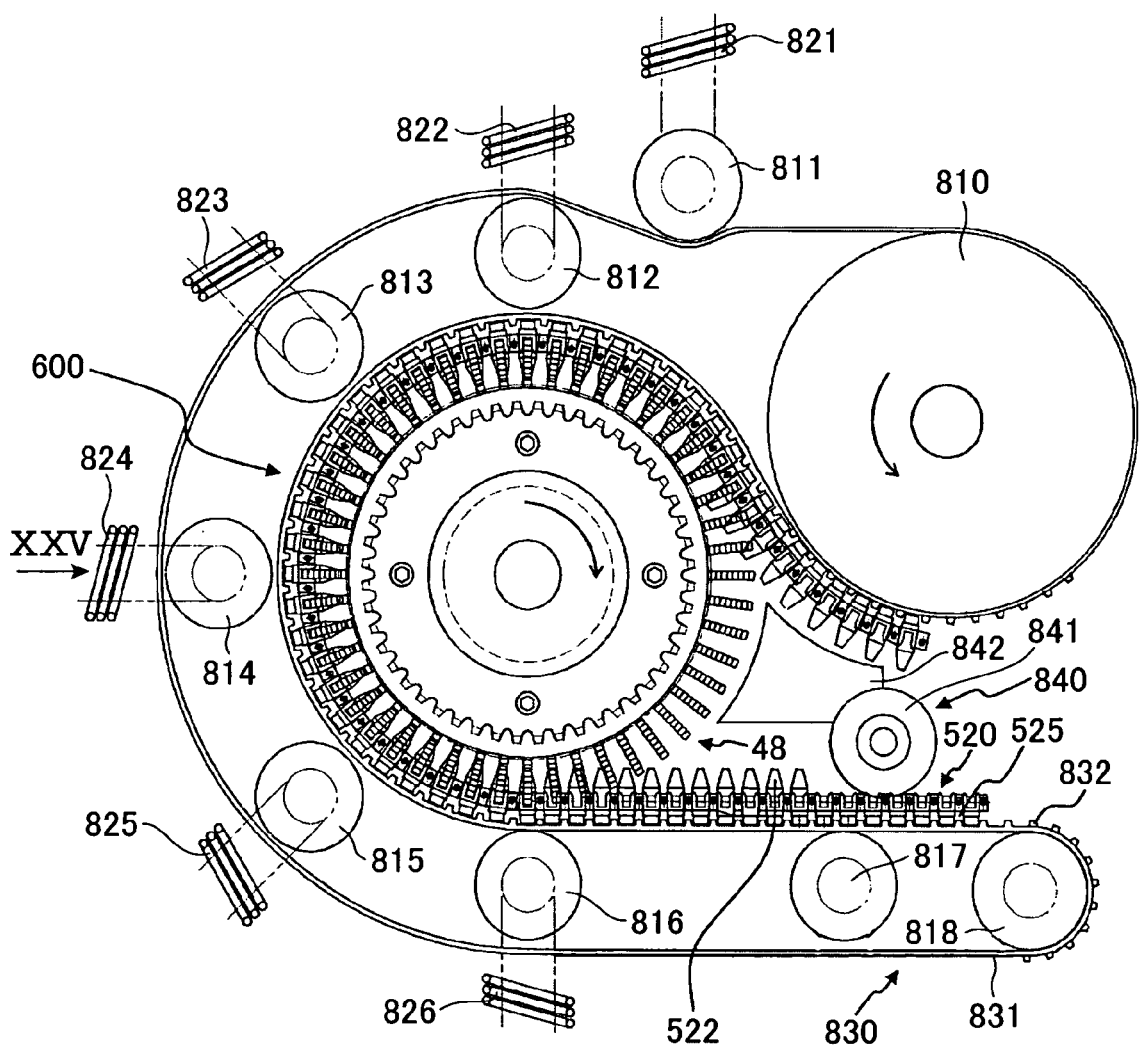
FIG. 24 is a schematic side view illustrating a state where, with the progress of winding turns from the state illustrated in FIG. 20, the fourth winding turn has been completed.
Figure 25:
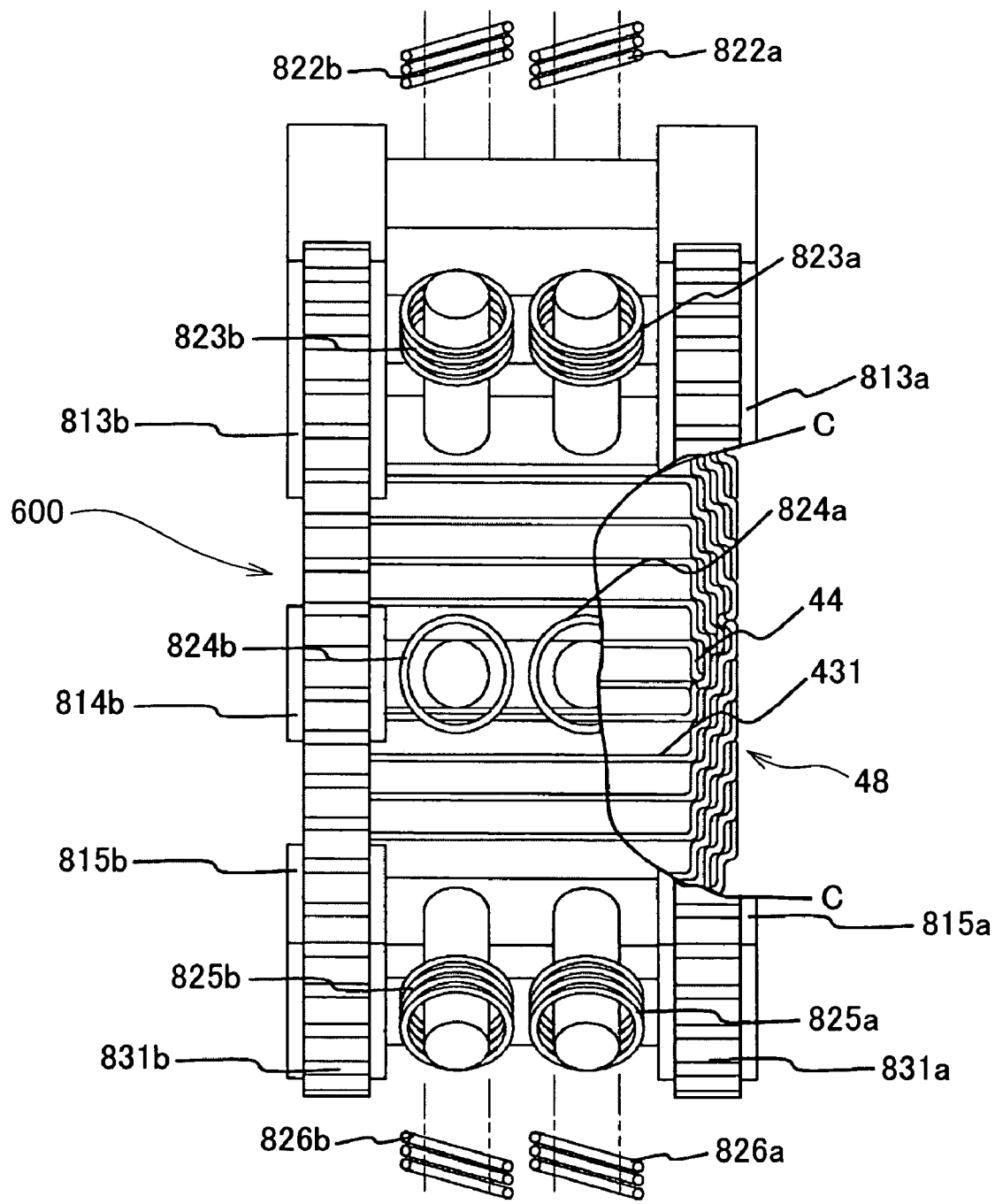
FIG. 25 is a schematic side view illustrating the state illustrated in FIG. 24, as viewed from a direction XXV.

FIG. 24 is a schematic side view illustrating a state where the fourth winding turn has been completed, with the progress of winding turns from the state shown in FIG. 20. FIG. 25 is a schematic side view, as viewed from a direction XXV of FIG. 24. Using a break line C-C in FIG. 25, the belt, the roller and the alignment member are partially removed so that the turn portions 44 of the integrated body 47 can be seen.

As to the first winding turn, the straight portions 431 are provided directly on the winding face 601. As to the second and the subsequent winding turns, the straight portions 431 are provided on the respective straight portions 431 already provided on the winding face 601 by the winding turns. Therefore, the conveyor belt 830 will advance radially outside the core member 600 more than it does in the state shown in FIG. 20. In the fourth embodiment, the control rollers 812, 813, 814, 815 and 816 biased by the spring members 822, 823, 824, 825 and 826, respectively, can move radially outward of the core member 600 to cope with the above radially outward advance. As to the end portion 842 of the separator/presser member 840 as well, the positions of its sharp end 842a and its presser face 842c are shifted according to the number of winding turns of the integrated body 47, i.e. according to the height of the straight portions 431 already provided on the winding face 601 of the core member 600 by the winding turns. These shifts are performed by moving the moving roller 841 using the control unit, not shown, or by driving the vertical movement mechanism, not shown.

Subsequently, the alignment member 520 is successively separated from the fitted body wound about the core member 600, leaving only the integrated body 47 on the winding face 601 of the core member 600 so as to be continuously wound up, whereby the wound-up body 48 is finally obtained.

The present invention can be applied to a rotary electric machine to be loaded on an electric vehicle or a hybrid vehicle. The present invention is advantageous in enhancing the slot occupancy in the stator of a rotary electric machine, and thus in enhancing the output of the rotary electric machine.

The method of manufacturing a stator coil of the present invention is not intended to be limited to the embodiments described above. The method of manufacturing a stator coil of the present invention may be implemented in various modes with modifications, improvements, or the like, that can be performed by a person skilled in the art, within a scope not departing from the spirit of the present invention.

What is claimed is:

1. A method of manufacturing a stator coil which is wound about a stator of a rotary electric machine and provides a plurality of phase windings, the method comprises:
    a shaping step of shaping a plurality of shaped wire members from electrically conductive wires providing the phase windings;
    an integrating step of forming an integrated body by integrating the plurality of shaped wire members with each other; and
    a winding step of forming a wound-up body by winding the integrated body about a core member, wherein:
    each of the shaped wire members has a plurality of straight portions juxtaposed in the longitudinal direction of the integrated body, and a plurality of turn portions alternately connecting the straight portions, which are adjacent to each other, at one end and the other end of each of the straight portions;
    the integrated body has a plurality of straight superposed portions in the longitudinal direction, the plurality of straight superposed portions each being formed by mutually superposing the plurality of straight portions;
    the wound-up body obtained at the winding step has a plurality of straight stack portions in the circumferential direction of the wound-up body; and
    at the winding step, the straight portions of the integrated body are fitted to respective fitting grooves of an alignment member, the fitting grooves being formed in the alignment member at intervals each corresponding to the size of a gap between adjacent ones of the plurality of straight stack portions, the integrated body being wound about the core member together with the alignment member, with the straight portions being fitted to the alignment member to form the wound-up body.

2. The method of manufacturing a stator coil according to claim 1, wherein, at the winding step, winding gears that engage with each other are provided at the core member and the alignment member to wind the integrated body about the core member together with the alignment member, with the mutual engagement of the winding gears.

3. The method of manufacturing a stator coil according to claim 2, wherein the alignment member has different depths that determine radial positions of the respective straight portions which have been fitted to the alignment member at the time of being wound about the core member, in response to radially different respective heights in the integrated body already wound about the core member.

4. The method of manufacturing a stator coil according to claim 3, wherein, at the winding step, curve forming is performed for the integrated body before being wound about the core member, according to a curvature of a winding face of the core member.

5. The method of manufacturing a stator coil according to claim 4, wherein, at the winding step, the curve forming for the integrated body is performed in a state where the straight portions of the integrated body are fitted to the respective fitting grooves of the alignment member.

6. The method of manufacturing a stator coil according to claim 5, wherein, at the winding step, the integrated body and the alignment member are conveyed by a conveyor belt, in winding the integrated body about the core member together with the alignment member in a state where the straight portions of the integrated body are fitted to the respective fitting grooves of the alignment member.

7. The method of manufacturing a stator coil according to claim 6, wherein, at the winding step, conveyor gears that engage with each other are provided at the conveyor belt and the alignment member to convey the integrated body and the alignment member by the conveyor belt, with the mutual engagement of the conveyor gears.

8. The method of manufacturing the stator coil according to claim 7, wherein, at the winding step, the integrated body is wound up with rotation of the core member, while speed of advance of the conveyor belt is adjusted so that the integrated body and the alignment member can be conveyed according to speed of advance of the integrated body at a position of being wound about the core member with the rotation.

9. The method of manufacturing a stator coil according to claim 1, wherein the alignment member has different depths that determine radial positions of the respective straight portions which have been fitted to the alignment member at the time of being wound about the core member, in response to radially different respective heights in the integrated body already wound about the core member.

10. The method of manufacturing a stator coil according to claim 9, wherein, at the winding step, curve forming is performed for the integrated body before being wound about the core member, according to a curvature of a winding face of the core member.

11. The method of manufacturing a stator coil according to claim 10, wherein, at the winding step, the curve forming for the integrated body is performed in a state where the straight portions of the integrated body are fitted to the respective fitting grooves of the alignment member.

12. The method of manufacturing a stator coil according to claim 10, wherein, at the winding step, the integrated body and the alignment member are conveyed by a conveyor belt, when the integrated body is wound about the core member together with the alignment member in a state where the straight portions of the integrated body are fitted to the respective fitting grooves of the alignment member.

13. The method of manufacturing a stator coil according to claim 1, wherein, at the winding step, curve forming is performed for the integrated body before being wound about the core member, according to a curvature of a winding face of the core member.

14. The method of manufacturing a stator coil according to claim 13, wherein, at the winding step, the curve forming for the integrated body is performed in a state where the straight portions of the integrated body are fitted to the respective fitting grooves of the alignment member.

15. The method of manufacturing a stator coil according to claim 1, wherein, at the winding step, a plurality of integrated bodies are used, with the straight portions of the integrated bodies being stuck one on the other and fitted to fitting grooves of an alignment member, the fitting grooves being formed in the alignment member at intervals each corresponding to the size of a gap between adjacent ones of the plurality of straight stack portions, the integrated bodies being wound about the core member together with the alignment member, with the straight portions being fitted to the alignment member to form the wound-up body.

16. The method of manufacturing a stator coil according to claim 1, wherein, at the winding step, the integrated body and the alignment member are conveyed by a conveyor belt, in winding the integrated body about the core member together with the alignment member in a state where the straight portions of the integrated body are fitted to the respective fitting grooves of the alignment member.

17. The method of manufacturing a stator coil according to claim 16, wherein, at the winding step, conveyor gears that engage with each other are provided at the conveyor belt and the alignment member to convey the integrated body and the alignment member by the conveyor belt, with the mutual engagement of the conveyor gears.

18. The method of manufacturing the stator coil according to claim 16, wherein, at the winding step, the integrated body is wound up with rotation of the core member, while speed of advance of the conveyor belt is adjusted so that the integrated body and the alignment member can be conveyed according to speed of advance of the integrated body at a position of being wound about the core member with the rotation.

19. The method of manufacturing a stator coil according to claim 1, wherein, at the winding step, winding turns are imparted with the integrated body wound about the core member being pressed against the core member in the radially inward direction.

20. The method of manufacturing a stator coil according to claim 1, wherein, at the winding step, a separator/presser member is used, the separator/presser member serving as an alignment member separator that separates the integrated body wound about the core member from the alignment member, and as an integrated body presser that presses the integrated body wound about the core member so as not to float from the core member.

* * * * *